US010627708B2

(12) United States Patent
Sugiyama et al.

(10) Patent No.: US 10,627,708 B2
(45) Date of Patent: Apr. 21, 2020

(54) PROJECTOR WITH COOLER

(71) Applicant: SEIKO EPSON CORPORATION, Tokyo (JP)

(72) Inventors: Nobuo Sugiyama, Azumino (JP); Naoya Okada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/232,915

(22) Filed: Dec. 26, 2018

(65) Prior Publication Data

US 2019/0196312 A1 Jun. 27, 2019

(30) Foreign Application Priority Data

Dec. 27, 2017 (JP) ................. 2017-250699

(51) Int. Cl.
| | |
|---|---|
| *G03B 21/16* | (2006.01) |
| *F25B 39/02* | (2006.01) |
| *F25B 19/00* | (2006.01) |
| *G03B 33/12* | (2006.01) |
| *F25B 23/00* | (2006.01) |

(52) U.S. Cl.
CPC .............. *G03B 21/16* (2013.01); *F25B 19/00* (2013.01); *F25B 39/028* (2013.01); *F25B 23/006* (2013.01); *G03B 33/12* (2013.01)

(58) Field of Classification Search
CPC .. G03B 21/006; G03B 21/16; G03B 21/2013; G03B 21/2033; F28D 15/00; F28D 15/02; F28D 15/04; F28D 15/208; F28D 15/0266; F28D 15/0283
See application file for complete search history.

(56) References Cited

U.S. PATENT DOCUMENTS

| | | | |
|---|---|---|---|
| 6,961,244 B2 | 11/2005 | Tsuchiya et al. | |
| 8,517,540 B2 | 8/2013 | Terao | |
| 2002/0191159 A1 | 12/2002 | Nagao et al. | |
| 2004/0190318 A1 | 9/2004 | Tsuchiya et al. | |
| 2009/0086169 A1* | 4/2009 | Nakamura | G03B 21/006 353/31 |

(Continued)

FOREIGN PATENT DOCUMENTS

| | | |
|---|---|---|
| JP | 2002-107698 A | 4/2002 |
| JP | 2002-372748 A | 12/2002 |

(Continued)

*Primary Examiner* — Sultan Chowdhury
(74) *Attorney, Agent, or Firm* — Oliff PLC

(57) ABSTRACT

A projector including a light source device configured to emit light, a light modulator configured to modulate the light emitted from the light source device in accordance with an image signal, a projection optical device configured to project the light modulated by the light modulator, and a cooler configured to cool a cooling target based on transformation of a refrigerant into a gas. The cooler includes a refrigerant generator configured to generate the refrigerant and a refrigerant sender configured to send the generated refrigerant toward the cooling target. The refrigerant generator includes a flow passage section through which the refrigerant flows. A portion of the inner surface of the flow passage section that is the portion facing the lower side in the gravity direction inclines with respect to the horizontal plane perpendicular to the gravity direction.

7 Claims, 14 Drawing Sheets

(56) References Cited

U.S. PATENT DOCUMENTS

| | | | | |
|---|---|---|---|---|
| 2010/0077772 A1* | 4/2010 | Shin | ......................... | F25B 5/00 |
| | | | | 62/56 |
| 2010/0171935 A1* | 7/2010 | Yamagishi | ............. | G03B 21/16 |
| | | | | 353/52 |
| 2011/0032489 A1* | 2/2011 | Kimoto | .................. | G03B 21/16 |
| | | | | 353/56 |
| 2011/0242499 A1 | 10/2011 | Terao | | |
| 2016/0147034 A1* | 5/2016 | Shoujiguchi | ............ | F28D 15/02 |
| | | | | 359/512 |
| 2016/0338226 A1* | 11/2016 | Sakamoto | ........... | F28D 15/0266 |

FOREIGN PATENT DOCUMENTS

| | | |
|---|---|---|
| JP | 2004-076997 A | 3/2004 |
| JP | 2004-297887 A | 10/2004 |
| JP | 2006-229102 A | 8/2006 |
| JP | 2007-294655 A | 11/2007 |
| JP | 2010-107751 A | 5/2010 |
| JP | 5609213 B2 | 10/2014 |

\* cited by examiner

PROJECTOR WITH COOLER

BACKGROUND

1. Technical Field

The present invention relates to a projector.

2. Related Art

To cool a projector, there is, for example, a proposed air-cooling cooler using an air blower (see JP-A-2002-107698, for example), a liquid-cooling cooler using a pump that delivers a refrigerant liquid and a pipe through which the refrigerant liquid passes (see JP-A-2007-294655, for example).

In recent years, increase in luminance of light outputted from a projector and other factors increase the amount of heat produced by a cooling target to be cooled by a cooler, and improvement in the cooling performance of the cooler is therefore required. To improve the cooling performance of the coolers using, for example, air-cooling or liquid-cooling described above, however, the coolers are enlarged, resulting in a problem of an increase in the size of the projector. Further, in the case of the air-cooling, there is also a problem of an increase in noise produced by the air blower.

SUMMARY

An advantage of some aspects of the invention is to provide a projector including a cooler that not only excels in cooling performance but is compact and excels in quietness.

A projector according to an aspect of the invention is a projector including a light source device configured to emit light, a light modulator configured to modulate the light emitted from the light source device in accordance with an image signal, a projection optical device configured to project the light modulated by the light modulator, and a cooler configured to cool a cooling target based on transformation of a refrigerant into a gas. The cooler includes a refrigerant generator configured to generate the refrigerant and a refrigerant sender configured to send the generated refrigerant toward the cooling target. The refrigerant generator includes a flow passage section through which the refrigerant flows. A portion of an inner surface of the flow passage section that is a portion facing a lower side in a gravity direction inclines with respect to a horizontal plane perpendicular to the gravity direction.

In the projector according to the aspect of the invention, the cooler is so configured that the refrigerant sender sends the refrigerant generated by the refrigerant generator to the cooling target and transformation of the refrigerant into a gas, which is an endothermic reaction, can be used to draw heat from the cooling target to cool the cooling target. The cooling based on the transformation of the refrigerant into a gas can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler is readily reduced as compared with the size required by air cooling or liquid cooling.

Further, in the cooling based on the transformation of the refrigerant into a gas, the cooling performance can be improved by an increase in the surface area where the refrigerant that is transformed into a gas comes into contact with the cooling target. Increasing the cooling performance of the cooler therefore does not cause an increase in noise. The projector according to the aspect of the invention can therefore be configured to excel in cooling performance, have a compact size, and excel in quietness.

In the projector according to the aspect of the invention, in which the refrigerant generator can generate the refrigerant, a user's convenience can be improved because the user does not need to replenish the refrigerant. Since the refrigerant generator can generate a necessary amount of refrigerant as necessary, no refrigerant needs to be stored, for example, in a storage tank, whereby the weight of the projector can be reduced.

Depending on the attitude of the flow passage section, for example, it is conceivable that the refrigerant generated by the refrigerant generator is likely to accumulate in the flow passage section. In this case, the refrigerant is sometimes unlikely to be sent by the refrigerant sender to the cooling target. The amount of refrigerant sent to the cooling target therefore decreases, and the effect of cooling the cooling target decreases accordingly in some cases.

In contrast, in the projector according to aspect of the invention, a portion of the inner surface of the flow passage section that is the portion facing the lower side in the gravity direction inclines with respect to the horizontal plane perpendicular to the gravity direction. The refrigerant in the flow passage section can therefore be moved by gravity along a portion of the inner surface of the flow passage section that is the portion facing the lower side in the gravity direction. The accumulation of the refrigerant in the flow passage section can therefore be avoided, whereby the situation in which the refrigerant is unlikely to be sent by the refrigerant sender can be avoided.

The flow passage section may include a pipe extending in a predetermined direction, and the predetermined direction may be a direction that inclines with respect to the horizontal plane perpendicular to the gravity direction.

According to the configuration described above, out of the inner surface of the pipe, which forms the inner surface of the flow passage section, a portion facing the lower side in the gravity direction is allowed to incline with respect to the horizontal plane perpendicular to the gravity direction. The refrigerant generated in the pipe can therefore be moved by gravity, whereby the refrigerant sender can preferably send the refrigerant.

Further, according to the configuration described above, in which the flow passage section is formed of the linearly extending pipe, the structure of the flow passage section can be simplified, whereby the structure of the cooler can be simplified. Therefore, the accumulation of the refrigerant in the flow passage section can be avoided, and the cost of manufacturing the cooler can be reduced at the same time.

The flow passage section may include a pipe extending in a predetermined direction, and the predetermined direction may be a direction that inclines with respect to a first direction parallel to an optical axis of the projection optical device and further inclines with respect to a plane perpendicular to the first direction.

According to the configuration described above, as compared with a case where the predetermined direction is parallel to the first direction or a case where the predetermined direction is perpendicular to the first direction, the attitude of the pipe is likely to incline with respect to the horizontal plane perpendicular to the gravity direction when the attitude of the projector is changed. The accumulation of the refrigerant in the flow passage section can therefore be avoided when the attitude of the projector is changed.

Therefore, even when the attitude of the projector is changed, the accumulation of the refrigerant in the flow passage section can be avoided, whereby the situation in which the refrigerant is unlikely to be sent by the refrigerant sender can be avoided.

The projector may further include an enclosure accommodating the light source device, the light modulator, the projection optical device and the cooler. The flow passage section may include a pipe extending in a predetermined direction. The enclosure may have a first surface extending in a first direction parallel to an optical axis of the projection optical device. The predetermined direction may be a direction that inclines with respect to at least two of the first surface, a second surface perpendicular to the first direction, and a third surface perpendicular to the first surface and the second surface.

According to the configuration described above, the predetermined direction is allowed to incline with respect to the horizontal plane perpendicular to the gravity direction in at least half of six attitudes frequently used as the attitude in which a projector is typically installed. Therefore, even when the attitude of the projector is changed, the accumulation of the refrigerant in the flow passage section can be further avoided, whereby the situation in which the refrigerant is unlikely to be sent by the refrigerant sender can be further avoided.

The predetermined direction may be a direction that inclines with respect to all the first surface, the second surface, and the third surface.

According to the configuration described above, the predetermined direction is allowed to incline with respect to the horizontal plane perpendicular to the gravity direction in all the six attitudes described above. Therefore, in any of the six attitudes described above, the refrigerant in the flow passage section can be moved by gravity. Therefore, even when the attitude of the projector is changed, the accumulation of the refrigerant in the flow passage section can be further avoided, whereby the situation in which the refrigerant is unlikely to be sent by the refrigerant sender can be further avoided.

The projector may further include an enclosure accommodating the light source device, the light modulator, the projection optical device and the cooler. The flow passage section may include a pipe extending in a predetermined direction. The enclosure may have a surface extending in a first direction parallel to an optical axis of the projection optical device, the surface being a counter surface that faces an installation site where the projector is installed. The predetermined direction may be a direction that inclines with respect to the first direction in such a way that the predetermined direction separates away from the counter surface as the predetermined direction extends toward a light exiting side of the projection optical device.

According to the configuration described above, in a case where a light-exiting-side portion of the projector is so lifted as to separate from the projector installation site, the inclination of the predetermined direction with respect to the horizontal plane increases. Therefore, even when the projector is caused to incline as described above, the attitude of the projector that causes the predetermined direction to be parallel to the horizontal plane does not occur, whereby the accumulation of the refrigerant in the flow passage section can be further avoided.

The refrigerant generator may include a moisture absorbing/discharging member rotating, a first air blower deliver air to a portion of the moisture absorbing/discharging member that is a portion located in a first region, a heat exchanger connected to the refrigerant sender, a heater configured to heat a portion of the moisture absorbing/discharging member that is a portion located in a second region different from the first region, and a second air blower configured to deliver, to the heat exchanger, air around the portion of the moisture absorbing/discharging member that is the portion heated by the heater. The heat exchanger includes the flow passage section into which the air delivered from the second air blower flows. The flow passage section, by cooling the air having flowed into the passage section, generates the refrigerant from the air having flowed into the flow passage section.

According to the configuration described above, the moisture absorbing/discharging member can absorb water vapor contained in the air delivered from the first air blower, and the moisture absorbed by the moisture absorbing/discharging member can be discharged in the form of water vapor into the air delivered by the second air blower. The heat exchanger 30 can then condense the moisture discharged in the form of water vapor into the air to generate the refrigerant. The refrigerant can therefore be generated from the atmosphere in the projector. Further, since the refrigerant is generated in the flow passage section, the prevention of the accumulation of the refrigerant in the flow passage section described above allows the refrigerant generated in the refrigerant generator to be readily and preferably sent to the cooling target.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projectors according to embodiments of the invention will be described below with reference to the drawings. The scope of the invention is not limited to the following embodiments and can be arbitrarily changed within the scope of the technical idea of the invention. In the following drawings, for clarity of each configuration, the scale, the number, and other factors of the structure of the configuration differ from the scale, the number, and the other factors of an actual structure in some cases.

First Embodiment

Figure 1:
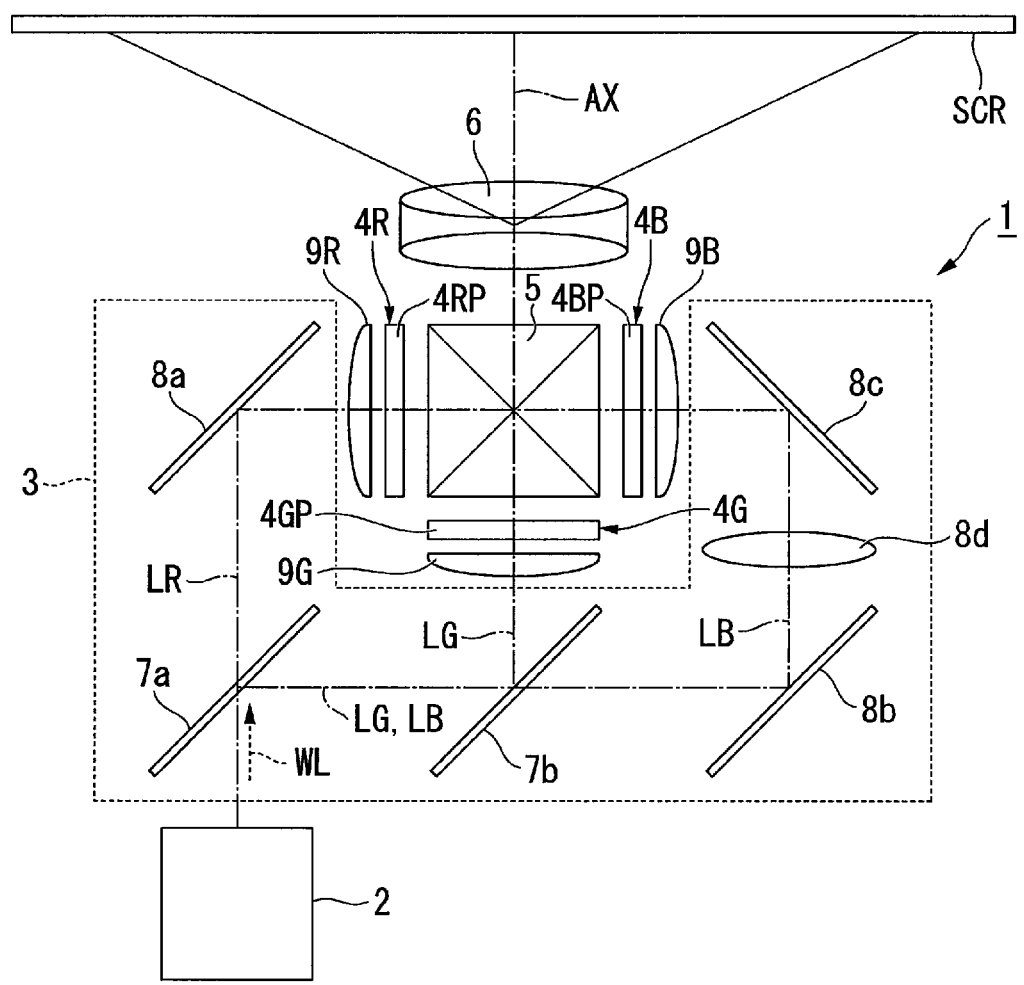
FIG. 1 is a schematic configuration diagram showing a projector according to a first embodiment.
Figure 2:
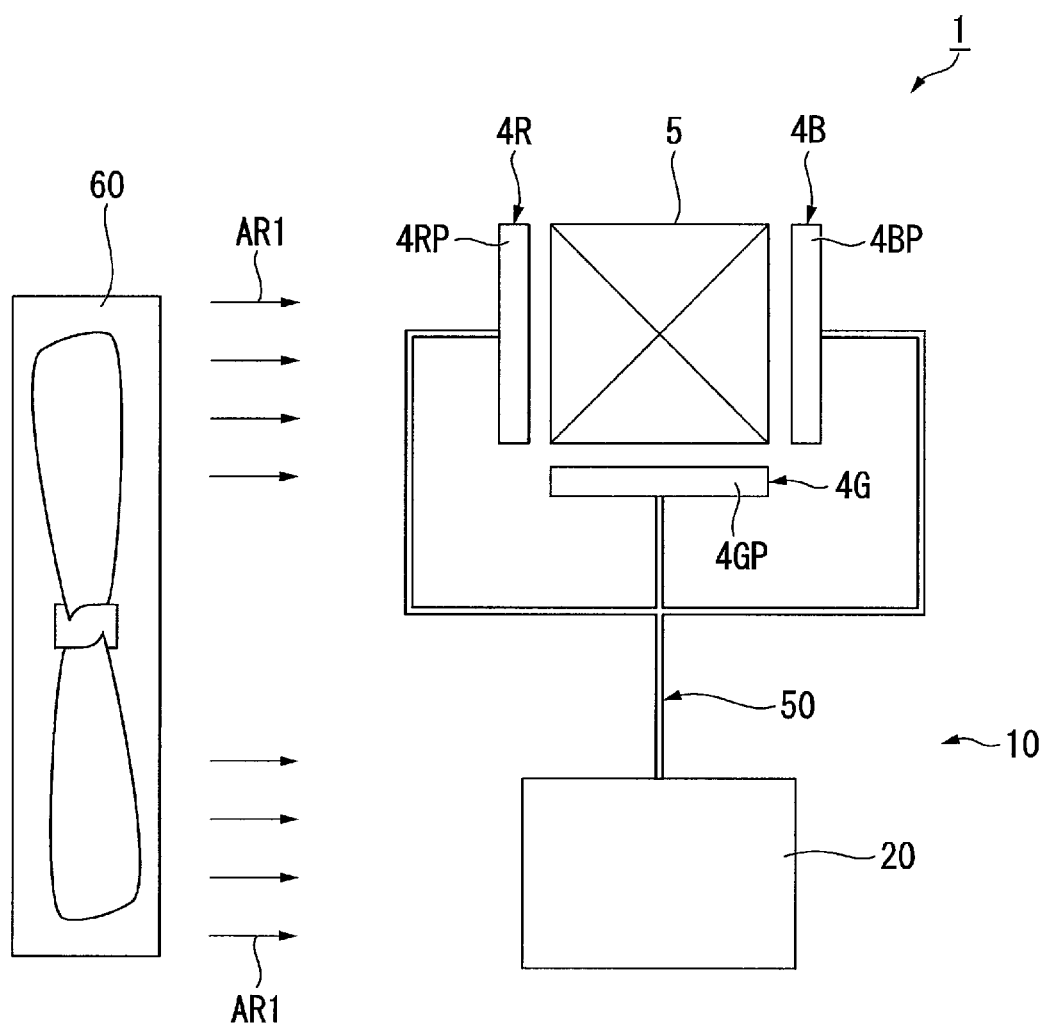
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source device 2, a color separation system 3, light modulation units 4R, 4G, and 4B, a light combining system 5, and a projection optical device 6, as shown in FIG. 1. The light modulation unit 4R includes a light modulator 4RP. The light modulation unit 4G includes a light modulator 4GP. The light modulation unit 4B includes a light modulator 4BP.

The light source device 2 outputs illumination light WL, which is so adjusted to have a roughly uniform illuminance distribution, toward the color separation system 3. The light source device 2 includes, for example, a semiconductor laser as a light source. The color separation system 3 separates the illumination light WL from the light source device 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source device 2 into the red light LR and light containing the green light LG and the blue light LB mixed with each other. The first dichroic mirror 7a is characterized in that it transmits the red light LR and reflects the green light LG and the blue light LB. The second dichroic mirror 7b separates the light containing the green light LG and the blue light LB mixed with each other into the green light LG and the blue light LB. The second dichroic mirror 7b is characterized in that it reflects the green light LG and transmits the blue light LB.

The first reflection mirror 8a is disposed in the light path of the red light LR and reflects the red light LR having passed through the first dichroic mirror 7a toward the light modulator 4RP. The second reflection mirror 8b and the third reflection mirror 8c are disposed in the light path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light from the light source device 2 in accordance with an image signal. The light modulator 4GP modulates the green light LG out of the light from the light source device 2 in accordance with an image signal. The light modulator 4BP modulates the blue light LB out of the light from the light source device 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a roughly cubic shape. The light combining system 5 combines the color image light fluxes from the light modulators 4RP, 4GP, and 4BP with one another. The light combining system 5 outputs the combined image light toward the projection optical device 6. The projection optical device 6 is formed of a group of projection lenses. The projection optical device 6 enlarges the combined image light from the light combining system 5, that is, the light fluxes modulated by the light modulators 4RP, 4GP, and 4BP and projects the enlarged image light toward a screen SCR. An enlarged color image (video images) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target (light modulation units 4R, 4G, and 4B in the present embodiment) vaporizes so as to be capable of drawing heat from the cooling target, whereby the cooler 10 can cool the cooling target. The refrigerant generator 20 and the refrigerant sender 50 will be described below in detail.

Figure 3:
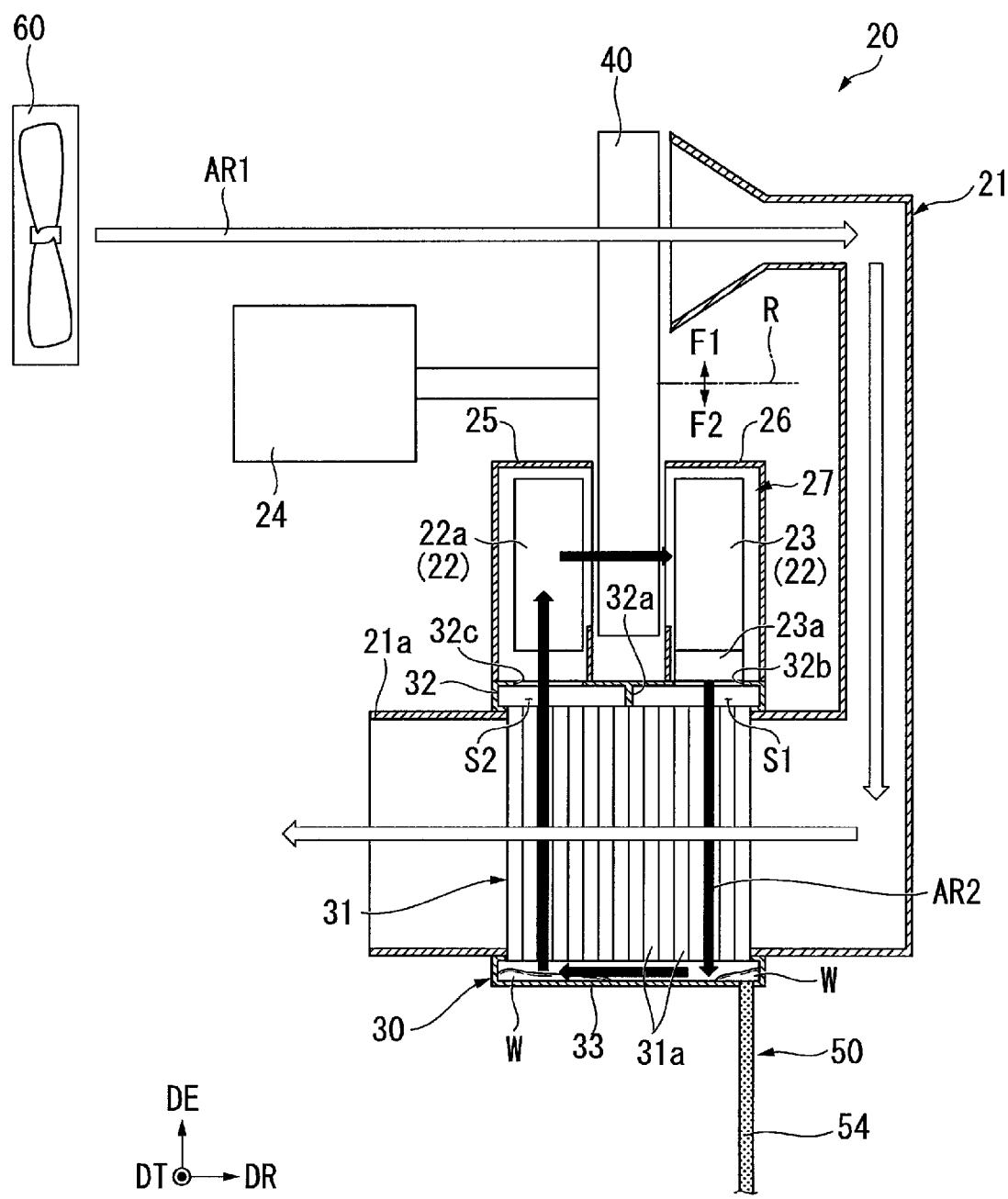
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor 24, a first air blower 60, a heat exchanger 30, a circulation duct 25, a circulation duct 26, a heater 22, a second air blower 23, and a cooling duct 21, as shown in FIG. 3.

Figure 4:
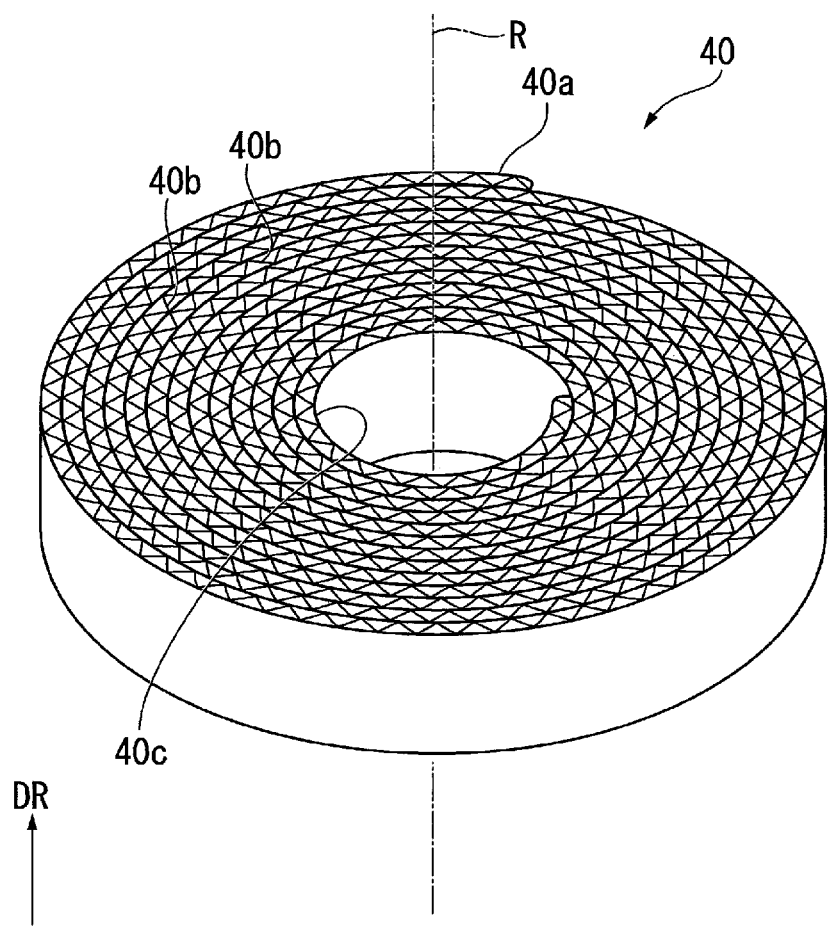
FIG. 4 is a perspective view of a moisture absorbing/discharging member in the first embodiment.

FIG. 4 is a perspective view of the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. The surface of the wound band-shaped member 40a that is the surface exposed to the ambient environment includes the outer surface of the moisture absorbing/discharging member 40, the inner circumferential surface of the central hole 40c, and inner surface of each of the through holes 40b. The moisture absorbing/discharging member 40 may instead be entirely made of a substance that absorbs and discharges moisture. An example of the substance that absorbs and discharges moisture may include zeolite.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 1 rpm but smaller than or equal to 5 rpm.

The first air blower 60 is, for example, an intake fan that takes outside air into the projector 1. The first air blower 60 delivers air AR1 to a portion of the moisture absorbing/discharging member 40 that is the portion located in a first region F1. The first region F1 is a region on one side of the axis of rotation R (upper side in FIG. 3) in the direction perpendicular to the axis of rotation R. On the other hand, the region on the other side of the axis of rotation R (lower side in FIG. 3) in the direction perpendicular to the axis of rotation R, that is, the region opposite the first region F1 is a second region F2.

The first air blower 60 delivers the air AR1 also to the light modulation units 4R, 4G, and 4B, which are each the cooling target, as shown in FIG. 2. The first air blower 60 is not limited to a specific device and may be any device capable of delivering the air AR1, for example, an axial fan and a centrifugal fan.

Figure 5:
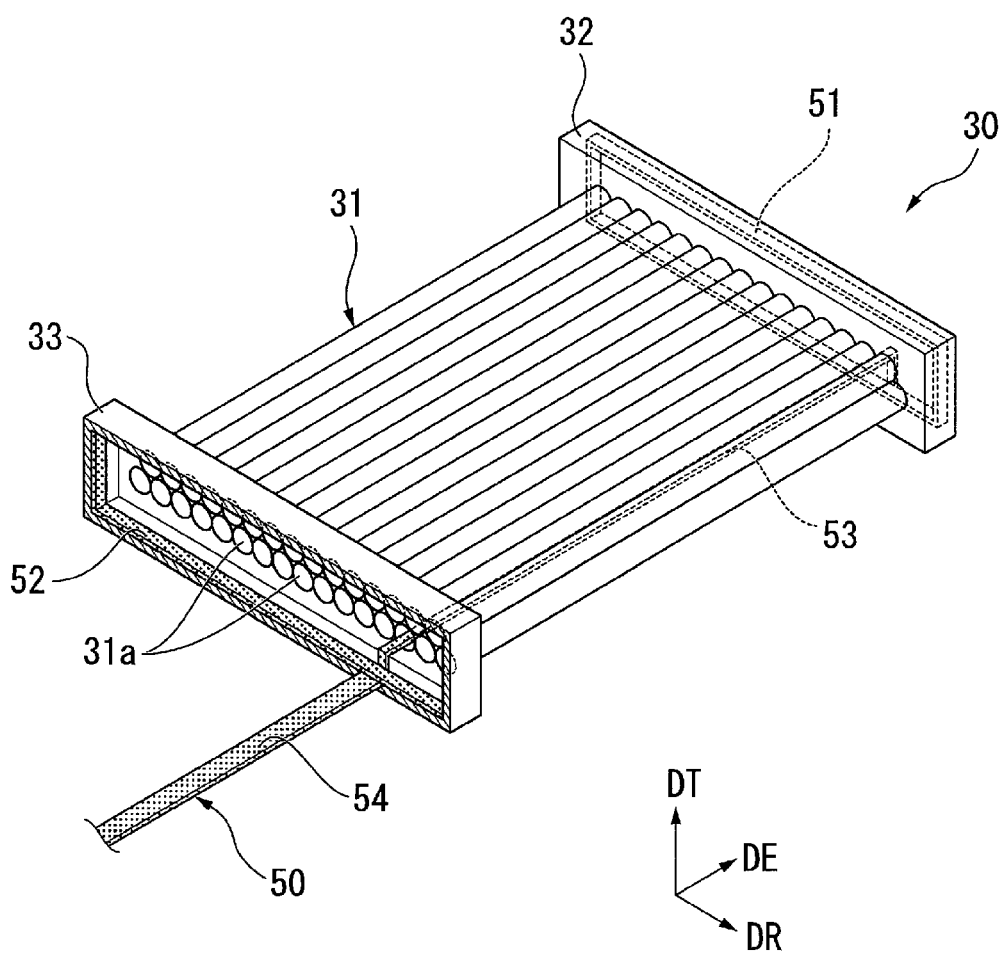
FIG. 5 is a partial cross-sectional perspective view showing a heat exchanger in the first embodiment.

The heat exchanger 30 is a portion that generates the refrigerant W. FIG. 5 is a partial cross-sectional perspective view showing the heat exchanger 30. The heat exchanger 30 includes a flow passage section 31, a first lid 32, and a second lid 33, as shown in FIG. 5.

The flow passage section 31 includes a plurality of pipes 31a, which each have a tubular shape and extend in a predetermined direction. In the present embodiment, the predetermined direction in which the pipes 31a extend is, for example, perpendicular to the rotational axis direction DR. The pipes 31a each open at the opposite ends thereof in the predetermined direction in which the pipe 31a extends. The pipes 31a each have, for example, a circular cross-sectional shape perpendicular to the predetermined direction, in which the pipe 31a extends. In the following description, the predetermined direction, in which the pipes 31a extend, is called an "extension direction (predetermined direction) DE" and drawn as appropriate in the form of an axis DE. The first region F1 and the second region F2 described above are separate with respect to the axis of rotation R from each other in the extension direction DE perpendicular to the rotational axis direction DR.

In the present embodiment, the flow passage section 31 is formed by layering a plurality of layers, which are each formed of the plurality of pipes 31a arranged in the rotational axis direction DR, on each other in the direction perpendicular to both the rotational axis direction DR and the extension direction DE. In the following description, the direction perpendicular to both the rotational axis direction DR and the extension direction DE is called a "thickness direction DT" and drawn as appropriate in the form of an axis DT. In the present embodiment, the dimension of the flow passage section 31 in the thickness direction DT is, for example, smaller than the dimension of the flow passage section 31 in the rotational axis direction DR and is the smallest of the dimensions of the flow passage section 31 in the directions perpendicular to the extension direction DE. In the present specification, the extension direction DE, the rotational axis direction DR, and the thickness direction DT are the directions of a three-dimensional orthogonal coordinate system showing the attitude of the heat exchanger.

The first lid 32 is connected to an end of the flow passage section 31 that is the end on one side in the extension direction DE (+DE side). The first lid 32 has the shape of a rectangular parallelepiped elongated in the rotational axis direction DR. One end of each of the pipes 31a in the extension direction DE opens in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on the right of the second space S2 (+DR side).

A communication hole 32b, which allows the first space S1 to be continuous with the interior of the circulation duct 26, is formed in the first lid 32. A communication hole 32c, which allows the second space S2 to be continuous with the interior of the circulation duct 25, is formed in the first lid 32.

The second lid 33 is connected to an end of the flow passage section 31 that is the end on the other side in the extension direction DE (−DE side), that is, the end opposite the end to which the first lid 32 is connected. The second lid 33 has the shape of a rectangular parallelepiped elongated in the rotational axis direction DR, as shown in FIG. 5. The other end of each of the pipes 31a in the extension direction DE opens in the second lid 33. The interior of the second lid 33 is not partitioned, unlike the first lid 32. The interior of the second lid 33 is continuous with the first space S1 and the second space S2 in the first lid 32 via the interior of the pipes 31a of the flow passage section 31. The second lid 33 is connected to the refrigerant sender 50. The heat exchanger 30 is thus connected to the refrigerant sender 50. In FIG. 5, a wall of the second lid 33 that is the wall located on the other side in the extension direction DE is omitted.

The circulation duct 26 is a duct disposed on one side of the moisture absorbing/discharging member 40 in the rotational axis direction DR (+DR side), as shown in FIG. 3. The circulation duct 26 has an inlet that faces a portion of the moisture absorbing/discharging member 40 that is the portion located in the second region F2 and opens toward the other side in the rotational axis direction DR (−DR side). The circulation duct 26 has an outlet continuous with the communication hole 32b in the first lid 32.

The circulation duct 25 is a duct disposed on the other side of the moisture absorbing/discharging member 40 in the rotational axis direction DR (−DR side). The circulation duct 25 has an outlet that faces a portion of the moisture absorbing/discharging member 40 that is the portion located in the second region F2 and opens toward the one side in the rotational axis direction DR (+DR side). The circulation duct 25 has an inlet continuous with the communication hole 32c in the first lid 32.

The heater 22 includes a heating main body 22a. The heating main body 22a is disposed in the circulation duct 25. The heating main body 22a is disposed on the other side (−DR side), in the rotational axis direction DR, of a portion of the moisture absorbing/discharging member 40 that is the portion located in the second region F2. The heating main body 22a is, for example, an electric heater. The heating main body 22a heats the atmosphere in the circulation duct 25. In the present embodiment, the heater 22 includes the second air blower 23.

The second air blower 23 is disposed in the circulation duct 26. The second air blower 23 is disposed on the one side (+DR side), in the rotational axis direction DR, of a portion of the moisture absorbing/discharging member 40 that is the portion located in the second region F2. The second air blower 23 is, for example, a centrifugal fan. The second air blower 23 exhausts air sucked from the other side in the rotational axis direction DR (−DR side) via an exhaust port 23a toward the other side in the extension direction DE (−DE side). The exhaust port 23a opens toward the communication hole 32b in the first lid 32. The second air blower 23 delivers the air into the first space S1 via the communication hole 32b.

The air discharged from the second air blower 23 into the first space S1 is the air having been sucked from the other side of the second air blower 23 in the rotational axis direction DR (−DR side) via the inlet of the circulation duct 26 and having passed through a portion of the moisture absorbing/discharging member 40 that is the portion located in the second region F2. That is, the second air blower 23 causes air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed in the circulation duct 25. The heating main body 22a therefore heats the air before passing through a portion of the moisture absorbing/discharging member 40 that is the portion located in the second region F2.

As described above, in the present embodiment, the heater 22 is so configured that the second air blower 23 delivers the air heated by the heating main body 22a to a portion of the moisture absorbing/discharging member 40 that is the portion located in the second region F2 to heat a portion of the moisture absorbing/discharging member 40 that is the portion located in the second region F2. The second air blower 23 thus delivers air around a portion of the moisture absorbing/discharging member 40 that is the portion heated by the heater 22 to the heat exchanger 30.

The air having flowed from the second air blower 23 into the heat exchanger 30 via the first space S1 passes through the pipes 31a continuous with the first space S1 out of the plurality of pipes 31a and flows into the second lid 33. The air having flowed into the second lid 33 passes through the pipes 31a continuous with the second space S2 out of the plurality of pipes 31a, flows into the second space S2, and flows into the circulation duct 25 via the communication hole 32c. The air having flowed into the circulation duct 25 is heated by the heating main body 22a, passes through a portion of the moisture absorbing/discharging member 40 that is the portion located in the second region F2 again, flows into the circulation duct 26, and is sucked by the second air blower 23.

As described above, in the present embodiment, the refrigerant generator 20 has a circulation path 27, through which the air exhausted from the second air blower 23 circulates. The circulation path 27 is formed of at least the circulation ducts 25 and 26 and the heat exchanger 30. The circulation path 27 passes through the heating main body 22a, the moisture absorbing/discharging member 40, and the heat exchanger 30. The circulation path 27 is roughly sealed although slight gaps are provided between the moisture absorbing/discharging member 40 and the circulation ducts 25, 26, and there is therefore no entry of air outside the circulation path 27 into the circulation path 27. In the following description, the air exhausted from the second air blower 23 and circulating through the circulation path 27 is called air AR2.

The cooling duct 21 is a duct having an inlet disposed on the one side (+DR side), in the rotational axis direction DR, of a portion of the moisture absorbing/discharging member 40 that is the portion located in the first region F1. Air flowing into the cooling duct 21 is the air AR1 having been exhausted from the first air blower 60 and having passed through a portion of the moisture absorbing/discharging member 40 that is the portion located in the first region F1. The cooling duct 21 extends from the one side of a portion of the moisture absorbing/discharging member 40 that is the portion located in the first region F1 toward the heat exchanger 30.

The cooling duct 21 includes a cooling passage 21a, which extends in the rotational axis direction DR. The flow passage section 31 of the heat exchanger 30 is so disposed in the cooling passage 21a as to pass thereacross in the extension direction DE. The flow passage section 31 is thus disposed in the cooling passage 21a. The air AR1 passing through the cooling passage 21a is sprayed onto the outer surface of the flow passage section 31 and passes by the flow passage section 31 in the rotational axis direction DR. The flow passage section 31 is thus cooled by the air AR1. That is, the heat exchanger 30 is cooled by the air AR1 having been exhausted from the first air blower 60 and having passed through the moisture absorbing/discharging member 40. In FIG. 3, in the cooling passage 21a, the air AR1 passes by the flow passage section 31 from right to left. The cooling passage 21a has an open end facing the other side in the rotational axis direction DR (−DR side). The opening of the cooling passage 21a is, for example, of an outlet of the cooling duct 21.

When the air AR1 is delivered from the first air blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 moves the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 is thus vaporized, and the vaporized moisture is discharged into the air AR2.

The air AR2 containing the water vapor absorbed from the air AR1 when the air AR1 passes through the moisture absorbing/discharging member 40 is delivered by the second air blower 23 to the heat exchanger 30. The air AR2 having flowed from the first space S1 into the heat exchanger 30 flows through the flow passage section 31. In more detail, the air AR2 flows through part of the pipes 31a of the flow passage section 31. The flow passage section 31 is externally cooled by the air AR1 flowing in the rotational axis direction DR through the cooling passage 21a of the cooling duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The flow passage section 31 (heat exchanger 30), when cooled, thus generates the refrigerant W from the air AR2 having flowed into the flow passage section 31 (heat exchanger 30). The refrigerant W generated in the flow passage section 31 flows through the flow passage section 31 and flows into the first lid 32 or the second lid 33.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, third catchers 53, and a connector 54, as shown in FIG. 5.

The first catcher 51 is fixed to an edge portion of the inner surface of the first lid 32 that is the edge portion facing the one side in the extension direction DE (+DE side). The first catcher 51 has a thin-band-like shape and is formed in a rectangular-frame-like shape extending along the edge portion of the first lid 32. The second catcher 52 is fixed to an edge portion of the inner surface of the second lid 33 that is the edge portion facing the other side in the extension direction DE (−DE side). The second catcher 52 has a thin-band-like shape and is formed in a rectangular-frame-like shape extending along the edge portion of the second lid 33.

The third catchers 53 extend from the first catcher 51, pass through the pipes 31a, and reach the second catcher 52, so that the third catchers 53 connect the first catcher 51 to the second catcher 52. The third catchers 53 each have a thin-band-like shape extending in the extension direction DE.

The connector 54 is a portion that connects the refrigerant generator 20 to the cooling target. In the present embodiment, the connector 54 is connected to the second catcher 52 and extends from the interior of the second lid 33, passes through the wall of the second lid 33, and protrudes out of the second lid 33. The connector 54, which protrudes out of the second lid 33, extends to the light modulation unit 4G, which is the cooling target (see FIG. 6). The connector 54 has a thin-band-like shape. The width of the connector 54 is, for example, greater than the width of the first catcher 51, the width of the second catcher 52, and the width of the third catchers 53.

The light modulation units 4R, 4G, and 4B, which are each the cooling target in the present embodiment, will next be described in more detail. In the following description, the direction parallel to an optical axis AX of a projection lens of the projection optical device 6 that is the projection lens closest to the light exiting side, that is, the direction parallel to the direction in which the projection optical device 6 projects light is called an "optical axis direction (first direction) PX" and is drawn as appropriate in the form of an axis PX. One of the directions perpendicular to the optical axis direction PX is called a "height direction PZ" and is drawn as appropriate in the form of an axis PZ. The direction perpendicular to both the optical axis direction PX and the height direction PZ is called a "width direction PY" and is drawn as appropriate in the form of an axis PY. In the present specification, the optical axis direction PX, the width direction PY, and the height direction PZ are the directions of a three-dimensional orthogonal coordinate system showing the attitude of the projector.

The height direction PZ and the width direction PY are merely names for describing the relative positional relationship among the portions of the projector, and an actual arrangement and other factors of the portions may differ from the arrangement and other factors indicated by the names.

Figure 6:
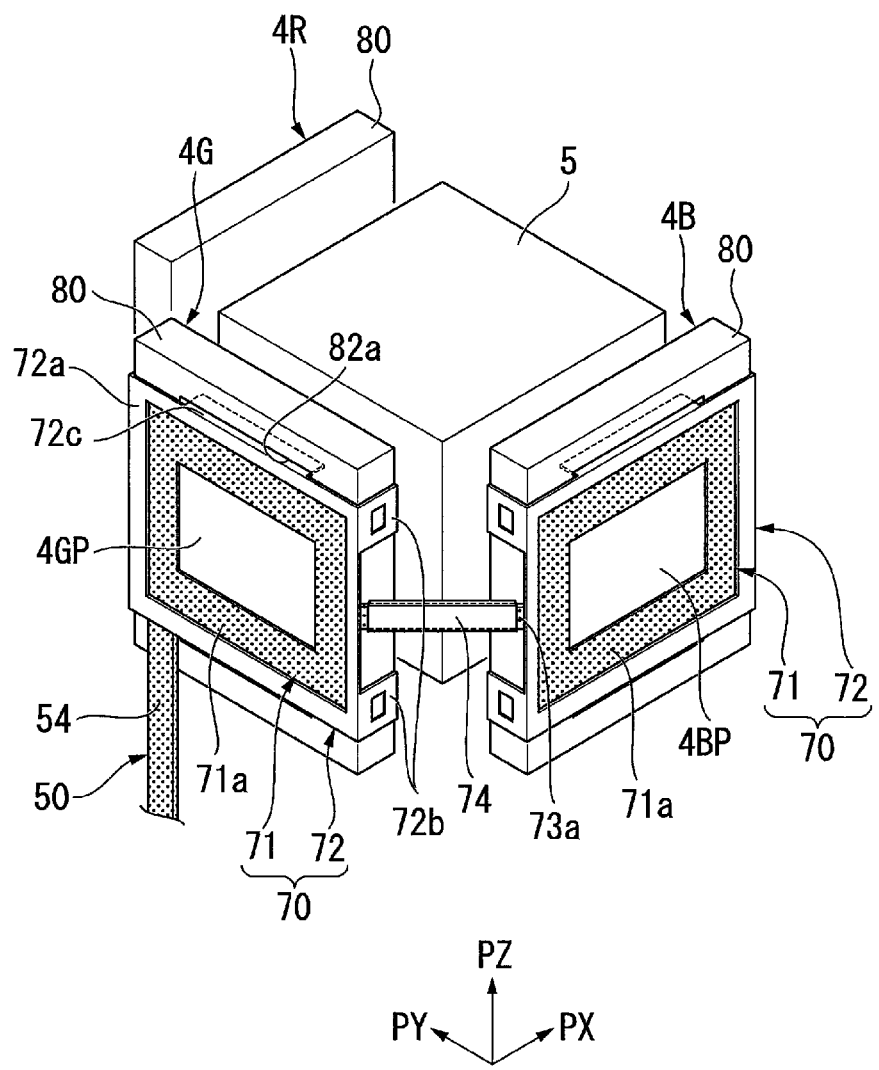
FIG. 6 is a perspective view showing light modulation units and a light combining system in the first embodiment.
Figure 7:
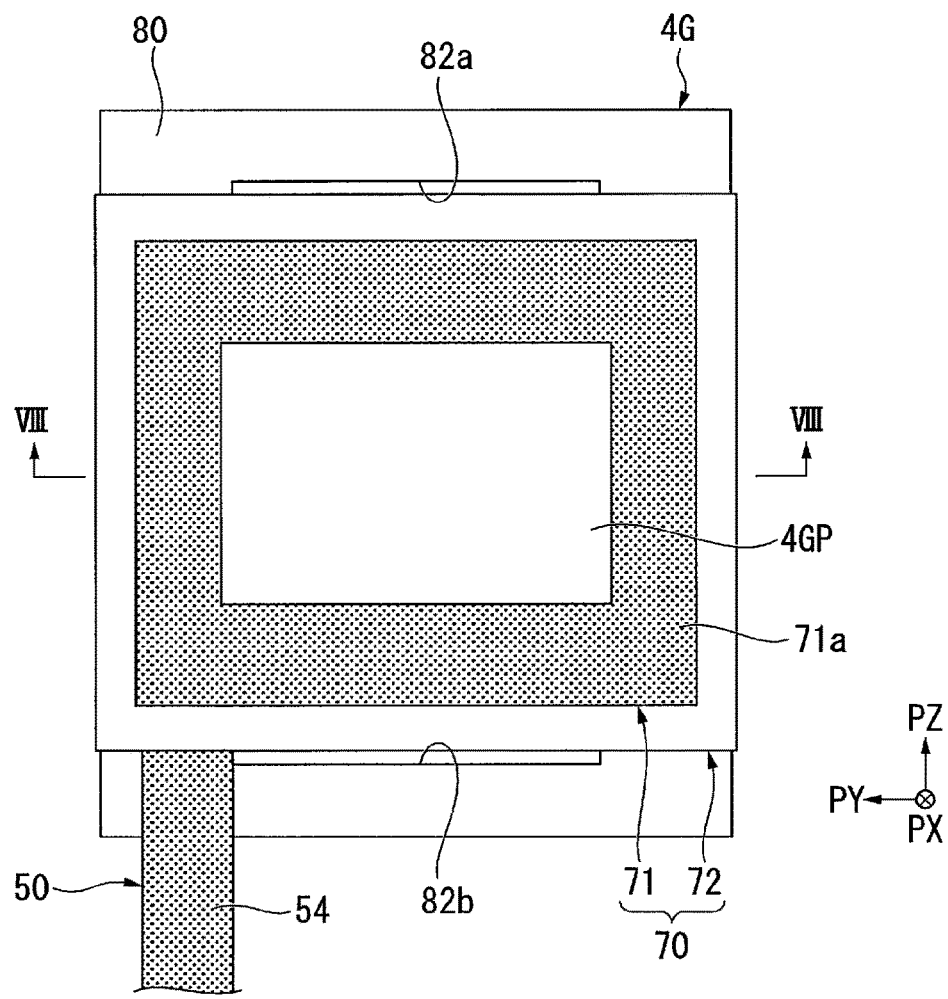
FIG. 7 shows one of the light modulation units in the first embodiment viewed from the light incident side.
Figure 8:
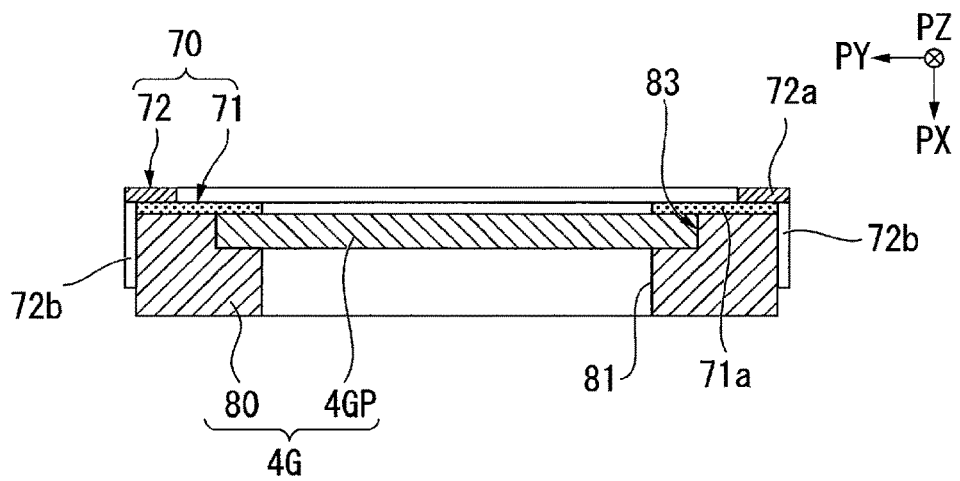
FIG. 8 is a cross-sectional view of the one light modulation unit in the first embodiment taken along the line VIII-VIII in FIG. 7.

FIG. 6 is a perspective view showing the light modulation units 4R, 4G, and 4B and the light combining system 5. FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides of the light combining system 5 as to sandwich the light combining system 5 in the width direction PY. The light modulation unit 4G is disposed on the light incident side of the light combining system 5 in the optical axis direction PX (−PX side). The light modulation units 4R, 4G, and 4B have the same structure except that they are disposed in different positions and take different attitudes, and only the light modulation unit 4G will therefore be representatively described below in some cases.

The light modulation unit 4G includes a holding frame (second holder) 80, which holds the light modulator 4GP. The holding frame 80 has the shape of a roughly rectangular parallelepiped that is flat in the direction in which light is incident on the light modulator 4GP and elongated in the height direction PZ, as shown in FIGS. 6 to 8. The direction in which light is incident on the light modulator 4GP is, for example, the optical axis direction PX.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−PX side in FIG. 8). The light modulator 4GP is so held by the holding frame 80 as to be fit into the stepped section 83. Insertion grooves 82a and 82b are formed through a surface of the holding frame 80 that is the surface facing the light incident side and in portions on the opposite sides of the holding frame 80 in the height direction PZ, as shown in FIG. 7.

The projector 1 further includes a cooling facilitator 70 provided as part of the light modulation unit 4G, which is the cooling target, as shown in FIGS. 6 to 8. The cooling facilitator 70 includes a refrigerant holder 71 and a fixing member 72. The refrigerant holder 71 is attached to the surface of the holding frame 80, which holds the light modulation unit 4G, which is the cooling target. In the present embodiment, the refrigerant holder 71 is provided on a surface of the holding frame 80 that is the surface facing the side toward which light is incident on the light modulator 4GP (−PX side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
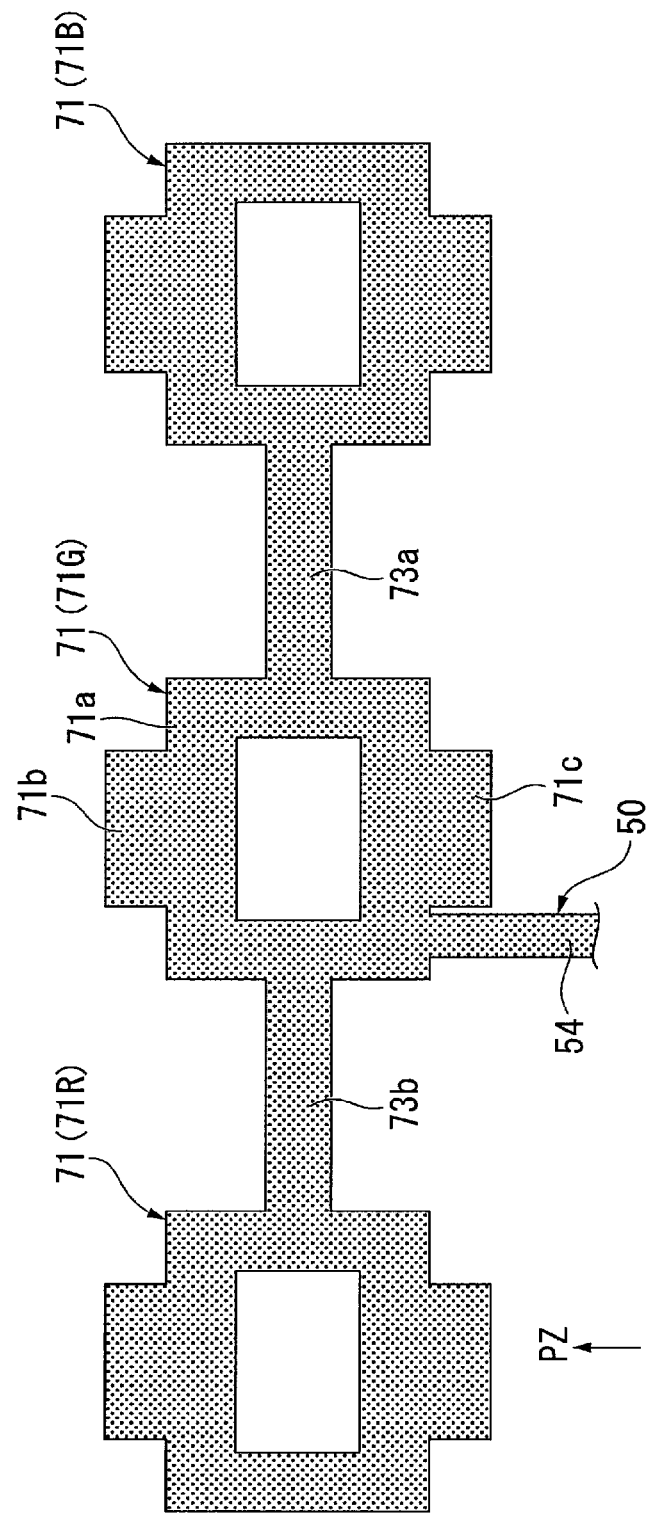
FIG. 9 shows refrigerant holders in the first embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a that are the opposite ends in the height direction PZ, as shown in FIG. 9. The main body section 71a covers part of a surface of the holding frame 80 that is the surface facing the side toward which light is incident on the light modulator 4GP (−PX side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of a metal. The fixing member 72 includes a frame section 72a, which has a rectangular-frame-like shape, attachment sections 72b, and insertion sections 72c. The frame section 72a covers an outer edge portion of the refrigerant holder 71, as shown in FIGS. 7 and 8. The holding frame 80, the refrigerant holder 71, and the frame section 72a are layered on each other in the direction in which light passes through the light modulator unit 4G (optical axis direction PX). In the following description, the direction in which the holding frame 80, the refrigerant holder 71, and the frame section 72a are layered on each other is simply called a "layering direction." The fixing member 72 fixes the refrigerant holder 71 in such a way that the frame section 72a and the holding frame 80 sandwich the refrigerant holder 71 in the layering direction (optical axis direction PX).

The inner edge of the frame section 72a is so provided as to be shifted outward from the inner edge of the refrigerant holder 71. A portion of the refrigerant holder 71, that is, in the present embodiment, the portion inside the frame section 72a is exposed when viewed in the layering direction from the side facing the fixing member 72.

The attachment sections 72b are provided at four end portions of the frame section 72a, opposite end portions in the height direction PZ and opposite end portions in the width direction PY, as shown in FIGS. 6 and 8. The attachment sections 72b protrude from the frame section 72a toward the holding frame 80 (+PX side). The attachment sections 72b engage with protrusions provided on the side surface of the holding frame 80. The fixing member 72 is thus fixed to the holding frame 80.

The insertion sections 72c are provided at the opposite ends of the frame section 72a in the height direction PZ. The insertion sections 72c protrude from the frame section 72a toward the holding frame 80 (+PX side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b.

The linkage section 73a links the refrigerant holder 71G attached to the light modulation unit 4G to the refrigerant holder 71B attached to the light modulation unit 4B. The refrigerant holder 71B is thus connected to the refrigerant sender 50 (connector 54) via the refrigerant holder 71G. The linkage section 73a is provided with a coating 74, which coats the linkage section 73a, as shown in FIG. 6. The coating 74 is, for example, a film made of a resin.

The linkage section 73b links the refrigerant holder 71 attached to the light modulation unit 4G to the refrigerant holder 71 attached to the light modulation unit 4R. The refrigerant holder 71R is thus connected to the refrigerant sender 50 (connector 54) via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held in the refrigerant holders 71 then vaporizes to cool the light modulation units 4R, 4G, and 4B, which are each the cooling target.

The attitude in which the heat exchanger 30 is arranged will next be described. In the following description, the direction of gravity is called a "gravity direction Z" and drawn as appropriate in the form of an axis Z. The positive side of the axis Z is the "upper side in the gravity direction," and the negative side of the axis Z is the "lower side in the gravity direction." One of the horizontal directions perpendicular to the gravity direction Z is called a "rightward/leftward direction Y" and drawn as appropriate in the form of an axis Y. One of the horizontal directions perpendicular to the gravity direction Z and perpendicular to the rightward/leftward direction Y is called a "frontward/rearward direction X" and drawn as appropriate in the form of an axis X. The positive side of the axis X is called a "front side," and the negative side of the axis X is called a "rear side."

Figure 10:
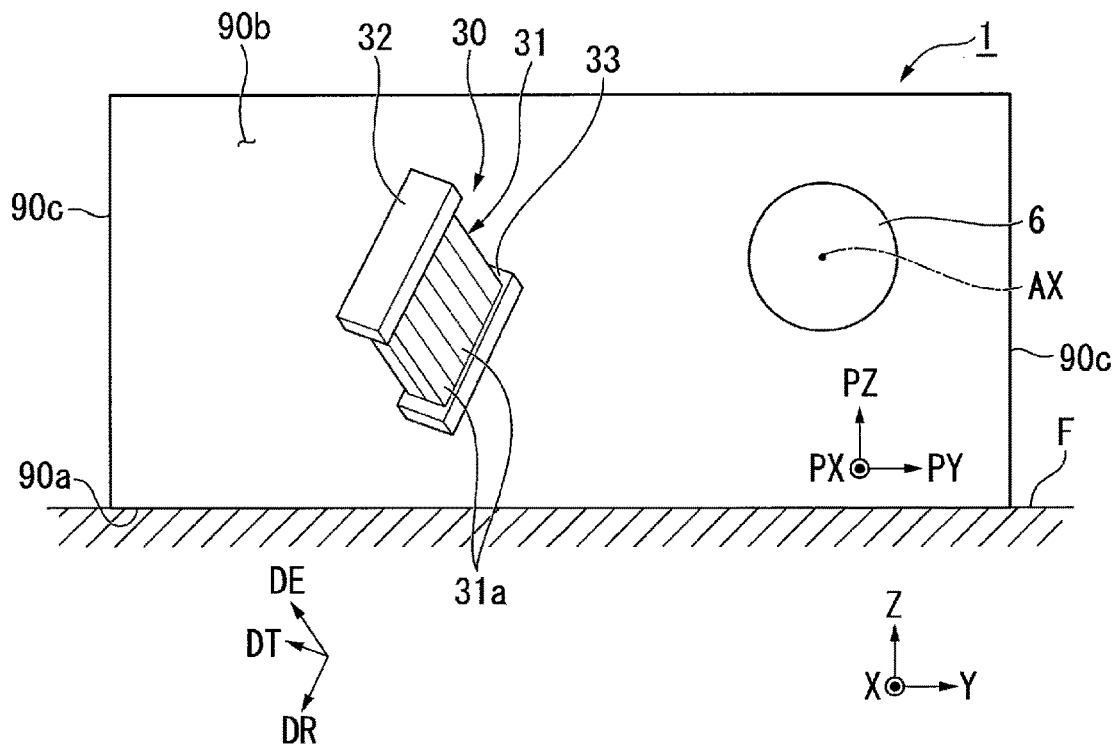
FIG. 10 shows the attitude of the heat exchanger in the first embodiment and is a front view of the projector in the first embodiment.
Figure 11:
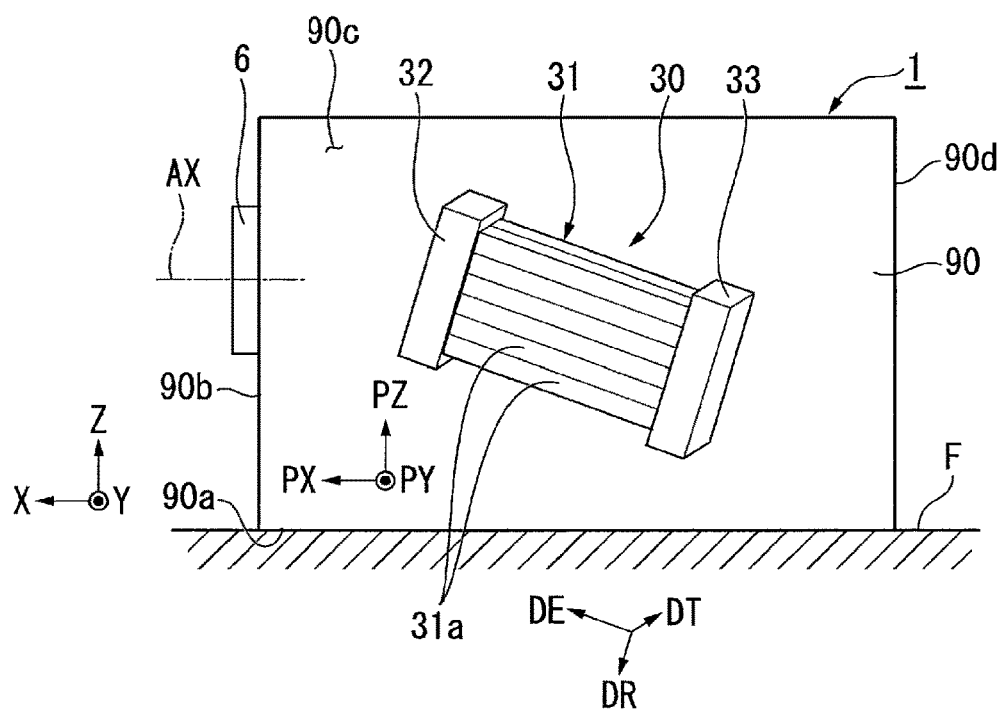
FIG. 11 shows the attitude of the heat exchanger in the first embodiment and is a side view of the projector in the first embodiment viewed in the rightward/leftward direction.
Figure 12:
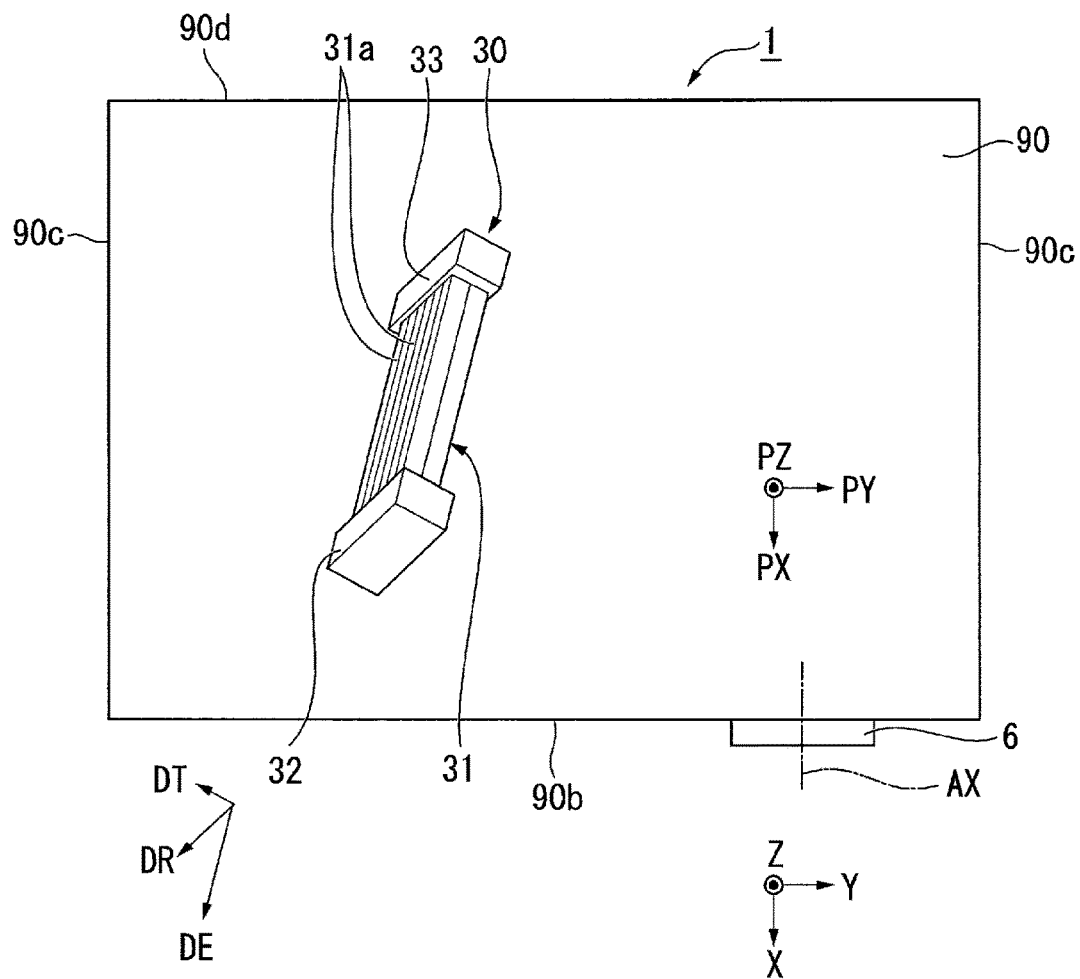
FIG. 12 shows the attitude of the heat exchanger in the first embodiment and is a plane view of the projector in the first embodiment viewed from the upper side in the gravity direction.

FIG. 10 shows the attitude of the heat exchanger 30 and is a front view of the projector 1. FIG. 11 shows the attitude of the heat exchanger 30 and is a side view of the projector 1 viewed in the rightward/leftward direction Y. FIG. 12 shows the attitude of the heat exchanger 30 and is a plan view of the projector 1 viewed from the upper side in the gravity direction. In FIGS. 10 to 12, the projector 1 is installed on a floor surface (installation site) F. That is, the floor surface F is an installation site where the projector 1 is installed. In FIGS. 10 to 12, the attitude of the projector 1 is so set that the optical axis direction PX is parallel to the frontward/rearward direction X, the width direction PY is parallel to the rightward/leftward direction Y, and the height direction PZ is parallel to the gravity direction Z.

The projector 1 further includes an enclosure 90, which accommodates the portions of the projector 1, such as the cooler 10, as shown in FIGS. 10 to 12. The enclosure 90 has the shape of a rectangular parallelepiped, and each side of the enclosure 90 extends in any of the optical axis direction PX, the width direction PY, and the height direction PZ. The enclosure 90 has a bottom surface (first surface, counter surface) 90a, which faces the floor surface F. The bottom surface 90a is a surface containing in the optical axis direction PX parallel to the optical axis AX of the projection optical device 6. The bottom surface 90a is perpendicular to the height direction PZ. In FIGS. 10 to 12, the bottom surface 90a is a surface of the enclosure 90 that is the surface facing the lower side in the gravity direction, and the bottom surface 90a is perpendicular to the gravity direction Z. In the attitude shown in FIGS. 10 to 12, the bottom surface 90a corresponds to the counter surface and is in contact with the floor surface F.

The heat exchanger 30 is disposed in the enclosure 90 and in an attitude so set that the extension direction DE, in which the pipes 31a of the flow passage section 31 extend, inclines with respect to not only the optical axis direction PX, the width direction PY, and the height direction PZ but the frontward/rearward direction X, the rightward/leftward direction Y, and the gravity direction Z. A portion of the inner surface of the flow passage section 31 that is the portion facing the lower side in the gravity direction inclines with respect to the horizontal plane (Plane XY) perpendicular to the gravity direction Z. In the present embodiment, the inner surface of the flow passage section 31 includes the inner surfaces of the plurality of pipes 31a.

In the attitude shown in FIGS. 10 to 12, the extension direction DE, in which the pipes 31a extend, is a direction that inclines with respect to the horizontal plane (Plane XY) perpendicular to the gravity direction Z. The extension direction DE is also a direction that inclines with respect to at least two of the bottom surface 90a, a second surface perpendicular to the optical axis direction PX (plane PY-PZ), and a third surface perpendicular to the bottom surface 90a and the second surface (plane PZ-PX). The second surface includes, for example, a front surface (second surface) 90b of the enclosure 90. The front surface 90b is a surface on the light exiting side in the optical axis direction PX (+PX side) and on the front side of the enclosure 90 in the attitude shown in FIGS. 10 to 12. The third surface includes, for example, side surfaces (third surface) 90c of the enclosure 90. The side surfaces 90c are surfaces of the enclosure 90 on the opposite sides in the rightward/leftward direction in the attitude shown in FIGS. 10 to 12.

In the present embodiment, the extension direction DE is a direction that inclines with respect to all the bottom surface 90a, the second surface including, for example, the front surface 90b, and the third surface including, for example, the side surfaces 90c. Further, the extension direction DE is a direction that inclines with respect to the optical axis direction PX, which is parallel to the optical axis AX of the projection optical device 6, and further inclines with respect to a plane perpendicular to the optical axis direction PX (plane PY-PZ, second surface). Moreover, the extension direction DE is a direction that inclines with respect to the optical axis direction PX in such a way that the extension direction DE separates away from the bottom surface 90a of the enclosure 90 (upward in gravity direction Z in FIGS. 10 to 12) as the extension direction DE extends toward the light exiting side (+PX side) of the projection optical device 6.

Since the extension direction DE is set as described above, in the attitude shown in FIGS. 10 to 12, the rotational axis direction DR and the thickness direction DT also incline with respect to not only the optical axis direction PX, the width direction PY, and the height direction PZ but the frontward/rearward direction X, the rightward/leftward direction Y, and the gravity direction Z.

According to the present embodiment, the cooler 10 is so configured that the refrigerant sender 50 can send the refrigerant W generated by the refrigerant generator 20 to the cooling target and vaporization of the refrigerant W, which is an endothermic reaction, can be used to draw heat from the cooling target to cool the cooling target. The cooling based on the vaporization of the refrigerant W can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore does not cause an increase in noise. According to the present embodiment, the projector 1 provided with the cooler 10 which is excel in cooling performance, have a compact size, and is excel in quietness can be obtained.

According to the present embodiment, in which the refrigerant generator 20 can generate the refrigerant W, a user's convenience can be improved because the user does not need to replenish the refrigerant W. Since the refrigerant generator 20 can generate a necessary amount of refrigerant W as necessary, the refrigerant W does not need to be stored, for example, in a storage tank, whereby the weight of the projector 1 can be reduced.

Depending on the attitude of the flow passage section 31, for example, it is conceivable that the refrigerant W generated by the refrigerant generator 20 is likely to accumulate in the flow passage section 31. In this case, the refrigerant W is sometimes unlikely to be sent by the refrigerant sender 50 to the cooling target. The amount of refrigerant W sent to the cooling target therefore decreases, and the effect of cooling the cooling target decreases accordingly in some cases.

In contrast, according to the present embodiment, a portion of the inner surface of the flow passage section 31 that is the portion facing the lower side in the gravity direction inclines with respect to the horizontal plane perpendicular to the gravity direction Z. The refrigerant W in the flow passage section 31 can therefore be moved by gravity along a portion of the inner surface of the flow passage section 31 that is the portion facing the lower side in the gravity direction. The accumulation of the refrigerant W in the flow passage section 31 can therefore be avoided, whereby the situation in which the refrigerant W is unlikely to be sent by the refrigerant sender 50 can be avoided.

According to the present embodiment, the extension direction DE, in which the pipes 31*a* extend, is a direction that inclines with respect to the horizontal plane perpendicular to the gravity direction Z. Therefore, out of the inner surfaces of the pipes 31*a*, which form the inner surface of the flow passage section 31, the inner surfaces facing the lower side in the gravity direction are allowed to incline with respect to the horizontal plane perpendicular to the gravity direction Z. The refrigerant W generated in the pipes 31*a* is therefore allowed to flow through the pipes 31*a* into the first lid 32 and the second lid 33 with the aid of gravity, whereby the refrigerant sender 50 can preferably send the refrigerant W.

According to the present embodiment, in which the flow passage section 31 is formed of the linearly extending pipes 31*a*, the structure of the flow passage section 31 can be simplified, whereby the structure of the cooler 10 can be simplified. Therefore, the accumulation of the refrigerant W in the flow passage section 31 can be avoided, and the cost of manufacturing the cooler 10 can be reduced at the same time.

Figure 13:
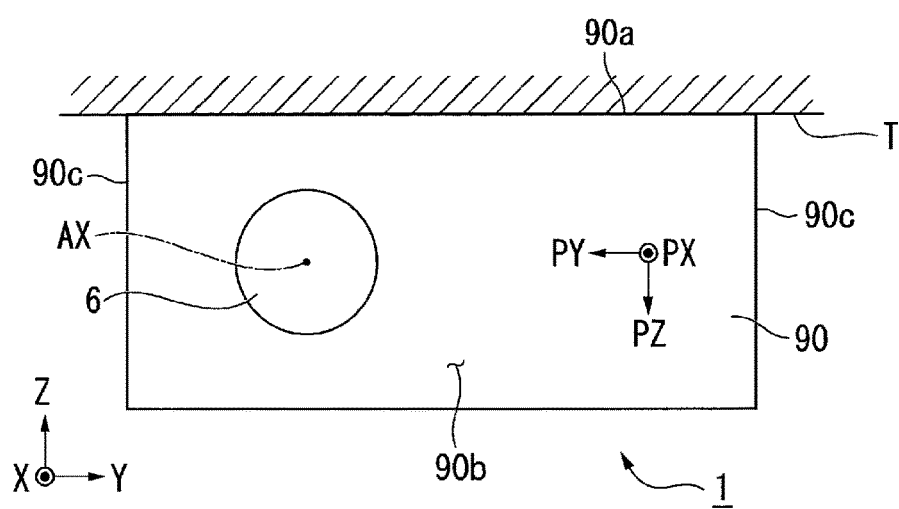
FIG. 13 shows another attitude in which the projector in the first embodiment is installed.
Figure 14:
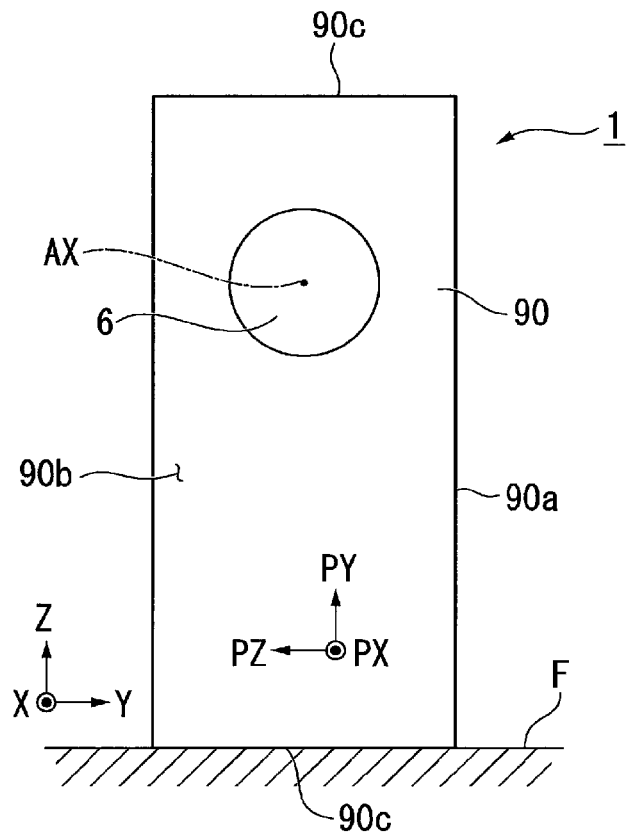
FIG. 14 shows another attitude in which the projector in the first embodiment is installed.
Figure 15:
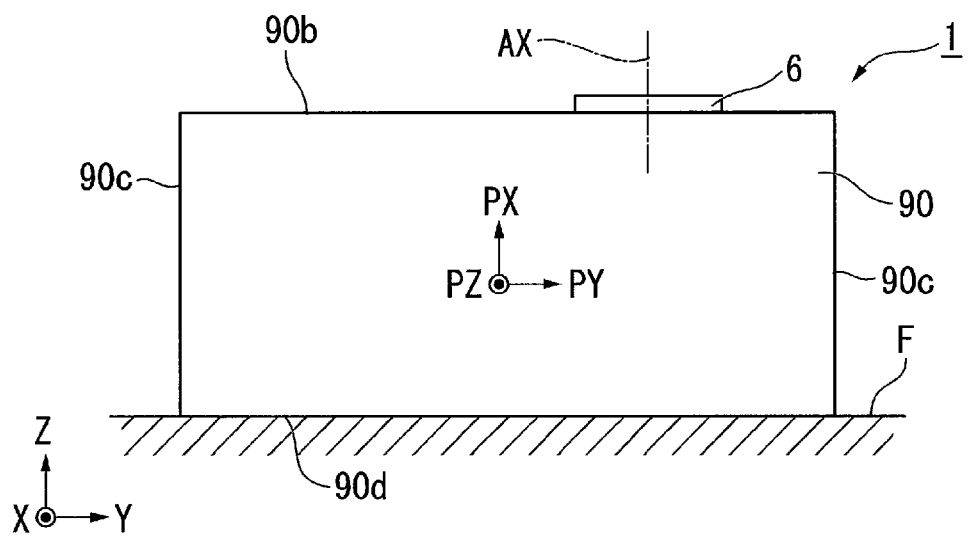
FIG. 15 shows another attitude in which the projector in the first embodiment is installed.

The attitude in which the projector 1 is installed is not limited, for example, to the attitude shown in FIGS. 10 to 12, and the projector 1 is installed in any of the attitudes shown in FIGS. 13 to 16 in some cases. FIGS. 13 to 16 show other attitudes in which the projector 1 is installed. In FIGS. 13 to 16, the projector 1 is installed on a ceiling surface (installation site) T. That is, the ceiling surface T is an installation site where the projector 1 is installed. In FIGS. 14 and 15, the projector 1 is installed on the floor surface F.

In FIG. 13, the attitude of the projector 1 differs from the attitude of the projector 1 shown in FIGS. 10 to 12 in that the projector 1 is reversed both in the gravity direction Z and in the rightward/leftward direction Y. In the attitude shown in FIG. 13, the bottom surface 90*a* corresponds to the counter surface and is in contact with the ceiling surface T.

In FIG. 14, the attitude of the projector 1 differs from the attitude of the projector 1 shown in FIGS. 10 to 12 in that the projector 1 is rotated by 90° around an axis parallel to the optical axis direction PX. In FIG. 14, the optical axis direction PX is parallel to the frontward/rearward direction X, the width direction PY is parallel to the gravity direction Z, and the height direction PZ is parallel to the rightward/leftward direction Y. In the attitude shown in FIG. 14, one of the side surfaces 90*c* corresponds to the counter surface and is in contact with the floor surface F.

In FIG. 15, the attitude of the projector 1 differs from the attitude of the projector 1 shown in FIGS. 10 to 12 in that the projector 1 is rotated by 90° around an axis parallel to the width direction PY. In FIG. 15, the optical axis direction PX is parallel to the gravity direction Z, the width direction PY is parallel to the rightward/leftward direction Y, and the height direction PZ is parallel to the frontward/rearward direction X. In the attitude shown in FIG. 15, the rear surface 90*d* of the enclosure 90 corresponds to the counter surface and is in contact with the floor surface F. The rear surface 90*d* is the surface opposite the front surface 90*b* in the optical axis direction PX (−PX-side surface), and the rear surface 90*d* is also the rear surface of the enclosure 90 in the attitude shown in FIGS. 10 to 12. In the attitude shown in FIG. 15, the projector 1 projects an image toward the upper side in the gravity direction.

Figure 16:
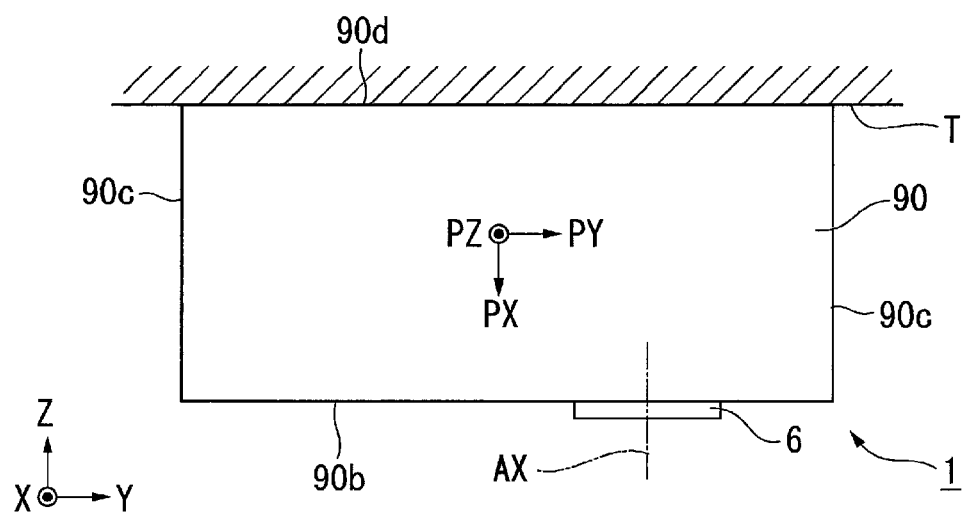
FIG. 16 shows another attitude in which the projector in the first embodiment is installed.

In FIG. 16, the attitude of the projector 1 differs from the attitude of the projector 1 shown in FIGS. 10 to 12 in that the projector 1 is rotated by 90° around an axis parallel to the width direction PY. In FIG. 16, the optical axis direction PX is parallel to the gravity direction Z, the width direction PY is parallel to the rightward/leftward direction Y, and the height direction PZ is parallel to the frontward/rearward direction X. In the attitude shown in FIG. 16, the rear surface 90*d* of the enclosure 90 corresponds to the counter surface and is in contact with the ceiling surface T. In the attitude shown in FIG. 16, the projector 1 projects an image toward the lower side in the gravity direction.

In addition to the attitudes shown in FIGS. 10 to 16 described above, the attitude obtained by reversing the attitude shown in FIG. 14 in the gravity direction Z and the rightward/leftward direction Y, six attitudes in total, are frequently used attitudes as the attitude in which a projector is typically installed. In a case where the attitude of the projector is changed to any of the attitudes described above, it is conceivable that the refrigerant W is likely to accumulate in the flow passage section 31 depending on the attitude of the flow passage section 31.

In contrast, according to the present embodiment, the extension direction DE, in which the pipes 31*a* extend, is a direction that inclines with respect to the optical axis direction PX and further to the plane perpendicular to the optical axis direction PX. Therefore, as compared with the case where the extension direction DE is parallel to the optical axis direction PX or the case where the extension direction DE is perpendicular to the optical axis direction PX, the attitude of the pipes 31*a* is likely to incline with respect to the horizontal plane perpendicular to the gravity direction Z when the attitude of the projector 1 is changed. The accumulation of the refrigerant W in the flow passage section 31 can therefore be avoided when the attitude of the projector 1 is changed. Therefore, even when the attitude of the projector 1 is changed, the accumulation of the refrigerant W in the flow passage section 31 can be avoided, whereby the situation in which the refrigerant W is unlikely to be sent by the refrigerant sender 50 can be avoided.

According to the present embodiment, the extension direction DE, in which the pipes 31*a* extend, is a direction that inclines with respect to at least two of the bottom surface 90*a*, the second surface perpendicular to the optical axis direction PX (front surface 90*b* and rear surface 90*d*, for example), and the third surface perpendicular to the bottom surface 90*a* and the second surface (side surfaces 90*c*, for example).

For example, in the case where the bottom surface 90*a* is the counter surface that faces the installation site, as in the attitude shown in FIGS. 10 to 12, in which the bottom surface 90*a* is parallel to the horizontal plane perpendicular to the gravity direction Z, the extension direction DE inclines with respect to the horizontal plane as long as the extension direction DE inclines with respect to the bottom surface 90*a*. For example, in the case where the rear surface 90*d*, which is the second surface, is the counter surface, as in the attitudes shown in FIGS. 15 and 16, in which the second surface (rear surface 90*d*) is parallel to the horizontal plane perpendicular to the gravity direction Z, the extension direction DE inclines with respect to the horizontal plane as long as the extension direction DE inclines with respect to the second surface (rear surface 90d). For example, in the case where one of the side surfaces 90c, which are the third surface, is the counter surface, as in the attitude shown in FIG. 14, in which the third surface (side surfaces 90c) is parallel to the horizontal plane perpendicular to the gravity direction Z, the extension direction DE inclines with respect to the horizontal plane as long as the extension direction DE inclines with respect to the third surface (side surfaces 90c).

Therefore, as long as the extension direction DE is a direction that inclines with respect to at least two of the bottom surface 90a, the second surface, and the third surface, the extension direction DE is allowed to incline with respect to the horizontal plane perpendicular to the gravity direction Z in at least half the six attitudes described above. Therefore, even when the attitude of the projector 1 is changed, the accumulation of the refrigerant W in the flow passage section 31 can be further avoided, whereby the situation in which the refrigerant W is unlikely to be sent by the refrigerant sender 50 can be further avoided.

According to the present embodiment, the extension direction DE is a direction that inclines with respect to all the bottom surface 90a, the second surface, and the third surface. The extension direction DE is therefore allowed to incline with respect to the horizontal plane perpendicular to the gravity direction Z in all the six attitudes described above. Therefore, even when the attitude of the projector 1 is changed to any of the six attitudes described above, the refrigerant W in the flow passage section 31 can be moved by gravity. Therefore, even when the attitude of the projector 1 is changed, the accumulation of the refrigerant W in the flow passage section 31 can be further avoided, whereby the situation in which the refrigerant W is unlikely to be sent by the refrigerant sender 50 can be further avoided.

Further, for example, in a case where the attitude of the projector 1 is so set that the optical axis AX of the projection optical device 6 is parallel to the horizontal direction (frontward/rearward direction X in FIGS. 10 to 13 perpendicular to the gravity direction Z, as shown in FIGS. 10 to 13), the light exiting side (+PX side) of the projection optical device 6 is so lifted as to be separate from the surface on which the projector 1 is installed in some cases. For example, in the attitude of the projector 1 shown in FIGS. 10 to 12, a light-exiting-side (+PX-side) portion of the projector 1 is lifted toward the upper side in the gravity direction by using a leg 191 in some cases, as in the attitude shown in FIGS. 17 to 19, which show a projector 101 according to a second embodiment, which will be described later. In such cases, in which the projector 1 takes an inclining attitude, it is conceivable that the refrigerant W is likely to accumulate in the pipes 31a, for example, because the extension direction DE, in which the pipes 31a extend, is, for example, parallel to the horizontal plane perpendicular to the gravity direction Z.

In contrast, according to the present embodiment, the extension direction DE is a direction that inclines with respect to the optical axis direction PX in such a way that the extension direction DE separates away from the bottom surface 90a of the enclosure 90, which is the counter surface, as the extension direction DE extends toward the light exiting side of the projection optical device 6 in FIGS. 10 to 13. Therefore, in the case where the light-exiting-side portion of the projector is so lifted as to separate from the floor surface F, the inclination of the extension direction DE with respect to the horizontal plane increases. Therefore, even when the projector 1 is caused to incline as described above, the attitude of the projector 1 that causes the extension direction DE to be parallel to the horizontal plane does not occur, whereby the accumulation of the refrigerant W in the flow passage section 31a can be further avoided.

According to the present embodiment, the moisture absorbing/discharging member 40 can absorb water vapor contained in the air AR1 delivered from the first air blower 60, and the moisture absorbed by the moisture absorbing/discharging member 40 can be discharged in the form of water vapor into the air AR2 delivered by the second air blower 23. The flow passage section 31 of the heat exchanger 30, into which the air AR2 delivered from the second air blower 23 flows, can then condense the moisture discharged in the form of water vapor into the air AR2 to generate the refrigerant W. Therefore, according to the present embodiment, the refrigerant W can be generated from the atmosphere in the projector 1. Further, since the refrigerant W is generated in the flow passage section 31, the prevention of the accumulation of the refrigerant W in the flow passage section 31 described above allows the refrigerant W generated in the refrigerant generator 20 to be readily and preferably sent to the cooling target.

According to the present embodiment, the refrigerant sender 50 sends the refrigerant W based on capillarity. No pump or any other power source for sending the refrigerant W therefore needs to be separately provided. An increase in the number of parts of the projector 1 can therefore be avoided, whereby the size and weight of the projector 1 are readily reduced.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W having flowed via the pipes 31a into the second lid 33 and having accumulated in the second lid 33 as described above and send the absorbed refrigerant W to the connector 54 based on capillarity. Therefore, the refrigerant sender 50 readily sends the refrigerant W, and the generated refrigerant W is readily delivered with no waste to the cooling target.

According to the present embodiment, the refrigerant sender 50 includes the catcher 51, which is provided in the first lid 32, and the third catchers 53, which connect the first catcher 51 to the second catcher 52. The first catcher 51 can therefore absorb the refrigerant W having accumulated in the first lid 32 and send the absorbed refrigerant W to the second catcher 52 via the third catchers 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target. Further, even when the attitude of the projector 1 is changed as described above, and one of the first lid 32 and the second lid 33 is located on the lower side in the gravity direction, the refrigerant sender 50 can preferably send the refrigerant W.

According to the present embodiment, the third catchers 53 pass through the pipes 31a. The third catchers 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target. Further, for example, even in a case where the refrigerant W is unlikely to move under gravity in the pipes 31a, the refrigerant W can be sent from the interior of the pipes 31a via the third catchers 53. The accumulation of the refrigerant W in the pipes 31a can therefore be further avoided.

According to the present embodiment, the width of the connector 54 is greater, for example, than the width of the first catcher 51, the width of the second catcher 52, and the width of the third catchers 53. The width of the connector 54 is therefore readily increased to a relatively large value, whereby the amount of refrigerant W that can be sent by the connector 54 can be increased. The refrigerant sender 50 can therefore readily deliver the refrigerant W to the cooling target, whereby the cooling target is readily further cooled.

On the other hand, the width of the first catcher 51, the width of the second catcher 52, and the width of the third catchers 53 are each readily set at a relatively small value. The amount of refrigerant W held by each of the first catcher 51, the second catcher 52, and the third catchers 53 can therefore be reduced. The amount of refrigerant W held by the first catcher 51, the second catcher 52, and the third catchers 53 and hence left in the heat exchanger 30 can therefore be reduced, whereby the generated refrigerant W is readily delivered with no waste to the cooling target.

According to the present embodiment, the heat exchanger 30 is cooled by the air AR1 having been exhausted from the first air blower 60 and having passed through the moisture absorbing/discharging member 40. No cooling section that cools the heat exchanger 30 therefore needs to be separately provided, whereby an increase in the number of parts of the projector 1 can be avoided. Further, an increase in noise produced by the projector 1 can be avoided unlike in a case where an air blower is separately provided as the cooling section that cools the heat exchanger 30.

According to the present embodiment, the first air blower 60 delivers the air AR1 to the light modulation units 4R, 4G, and 4B, which are each the cooling target. The refrigerant W sent by the air AR1 to the light modulation units 4R, 4G, and 4B therefore readily vaporizes, whereby the light modulation units 4R, 4G, and 4B can be further cooled. Further, since no air blower that cools the cooling target needs to be separately provided, an increase in the number of parts of the projector 1 can be avoided, and an increase in the noise can be avoided.

In the present embodiment, the first air blower 60, which is an intake fun that takes the outside air into the projector 1, is used to facilitate the vaporization of the refrigerant W delivered to the cooling target, as described above. Therefore, even when the power of the first air blower 60 is lowered, the same cooling performance provided in a case where no cooler 10 is provided can still be provided. The noise produced by the first air blower 60, which is an intake fan, can therefore be reduced by lowering the power of the first air blower 60, whereby the quietness of the projector 1 can be further improved.

For example, in the refrigerant generator 20, when the humidity of the air AR2 delivered from the second air blower 23 to the heat exchanger 30 is relatively low, cooling the heat exchanger 30 is unlikely to allow generation of the refrigerant W in some cases. For example, in a case where air or any other substance outside the projector 1 mixes with the air AR2 delivered to the heat exchanger 30, the humidity of the air AR2 decreases in some cases.

In contrast, according to the present embodiment, the refrigerant generator 20 has the circulation path 27, through which the air AR2 exhausted from the second air blower 23 circulates. Configuring the circulation path 27 as a roughly sealed path can therefore prevent the air outside the projector 1 from entering the circulation path 27, whereby the humidity of the air AR2 delivered to the heat exchanger 30 can be maintained relatively high. Cooling the heat exchanger 30 therefore allows the refrigerant W to be preferably generated.

According to the present embodiment, the heater 22 includes the heating main body 22a, which heats the air before passing through a portion of the moisture absorbing/discharging member 40 that is the portion located in the second region F2, and the second air blower 23. The heater 22, in which the second air blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant holders 71, which hold the refrigerant W, are provided in the light modulation units 4R, 4G, and 4B, which are each the cooling target. The refrigerant holder 71 can therefore hold the refrigerant W sent to the light modulation units 4R, 4G, and 4B in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, in a case where the refrigerant holders 71 are fixed to the holding frames 80 with an adhesive, the pores in the refrigerant holders 71, which are each formed of a porous member, are closed with the adhesive absorbed by the refrigerant holders 71 in some cases. The refrigerant holders 71 are therefore unlikely to absorb and hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with no adhesive adhering to the refrigerant holders 71. The situation in which the refrigerant holders 71 are unlikely to hold the refrigerant W can therefore be avoided. Further, in the present embodiment, the fixing members 72 are made of a metal. The fixing members 72 therefore have relatively high heat conductivity and are hence likely to be cooled. The air AR1 from the first air blower 60 and the vaporization of the refrigerant W readily lower the temperature of the fixing members 72, whereby the cooling target, which is in contact with fixing members 72, is readily further cooled.

According to the present embodiment, the refrigerant holder 71G is provided on a surface of the holding frame 80 that is the surface facing the side toward which light is incident on the light modulator 4GP. The configuration described above can prevent the water vapor that is the vaporized refrigerant W discharged from the refrigerant holder 71G from affecting the light that exits out of the light modulator 4GP toward the light combining system 5 and can therefore prevent formation of noise in an image projected from the projector 1.

According to the present embodiment, the refrigerant holders 71 are provided in the plurality of light modulation units 4R, 4G, and 4B, and the linkage sections 73a and 73b are provided and link the plurality of refrigerant holders to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the coatings 74, which coat the linkage sections 73a and 73b. A situation in which the refrigerant W that moves along the linkage sections 73a and 73b vaporizes via the linkage sections 73a and 73b can therefore be avoided. Therefore, a situation in which the refrigerant W vaporizes without contributing to the cooling of the light modulation units 4R, 4G, and 4B, which are each the cooling target, can be avoided, whereby no waste of the generated refrigerant W occurs.

In the present embodiment, the connector 54 may also be coated, as are the linkage sections 73a and 73b. The configuration described above can prevent vaporization of the refrigerant W being sent to the cooling target. Therefore, the refrigerant W can be efficiently sent to the cooling target, and waste of the generated refrigerant W can further be suppressed. The circumference of each of the connector 54 and the linkage sections 73a and 73b may instead be covered, for example, with a tube. A coating treatment that suppresses vaporization may still instead be performed on the surface of each of the connector 54 and the linkage sections 73a and 73b.

Second Embodiment

A second embodiment differs from the first embodiment in terms of the attitude of the heat exchanger with respect to the enclosure of the projector. It is noted that configurations similar to those described above, for example, have the same reference characters as appropriate, and that no description thereof will therefore be made in some cases.

Figure 17:
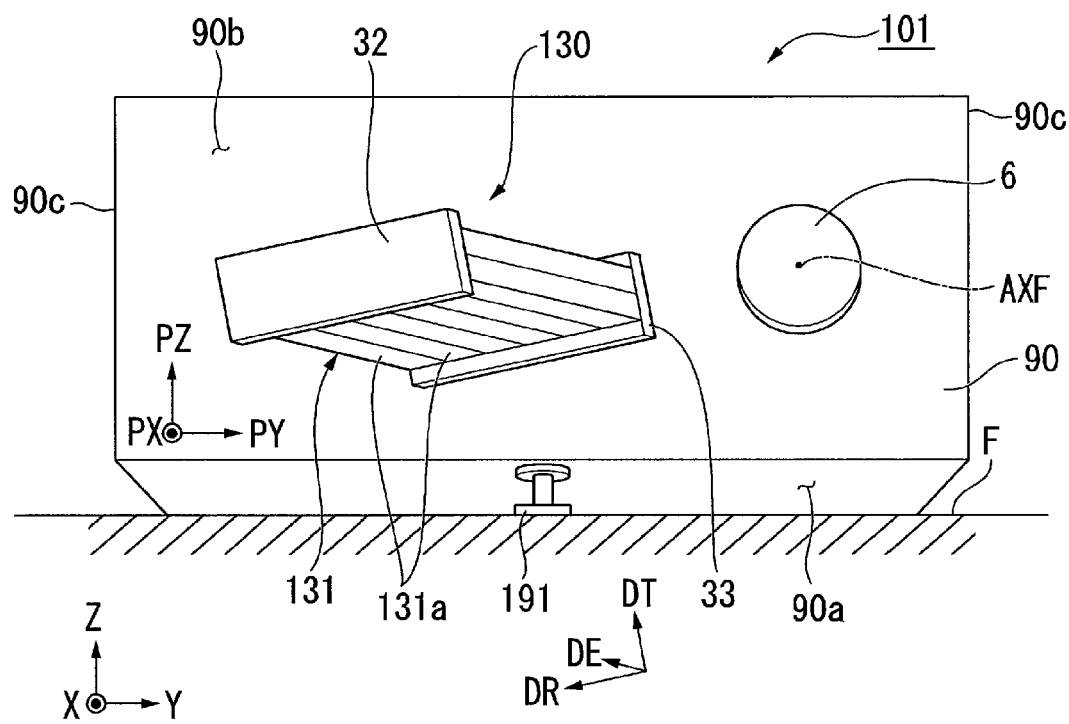
FIG. 17 shows the attitude of a heat exchanger in a second embodiment and is a front view of a projector in the second embodiment.
Figure 18:
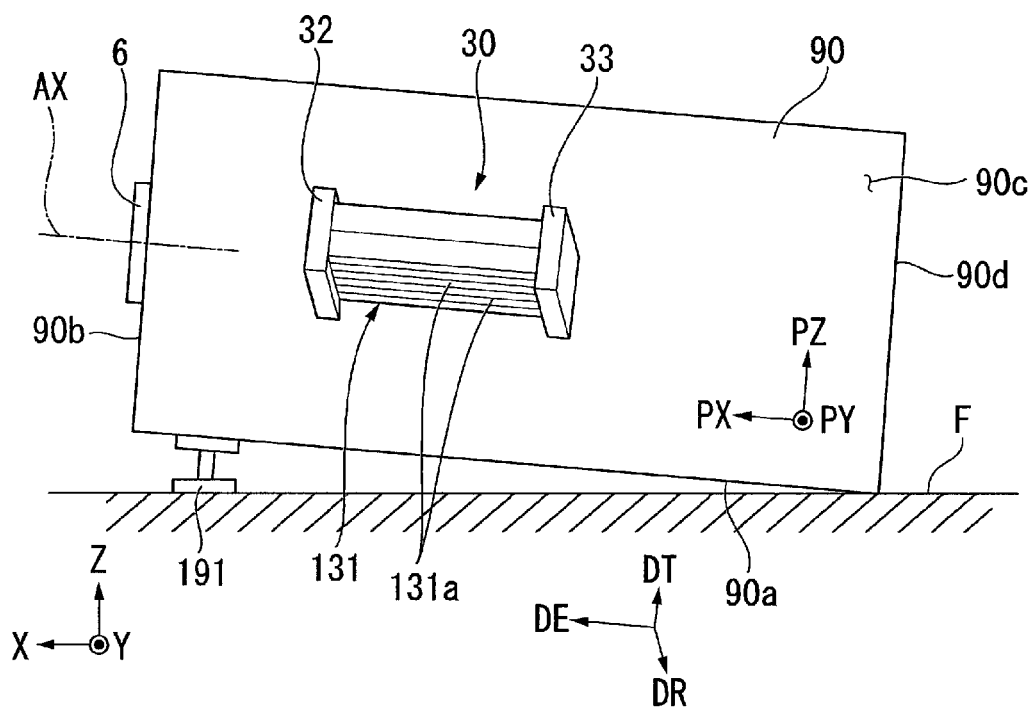
FIG. 18 shows the attitude of the heat exchanger in the second embodiment and is a side view of the projector in the second embodiment viewed in the rightward/leftward direction.
Figure 19:
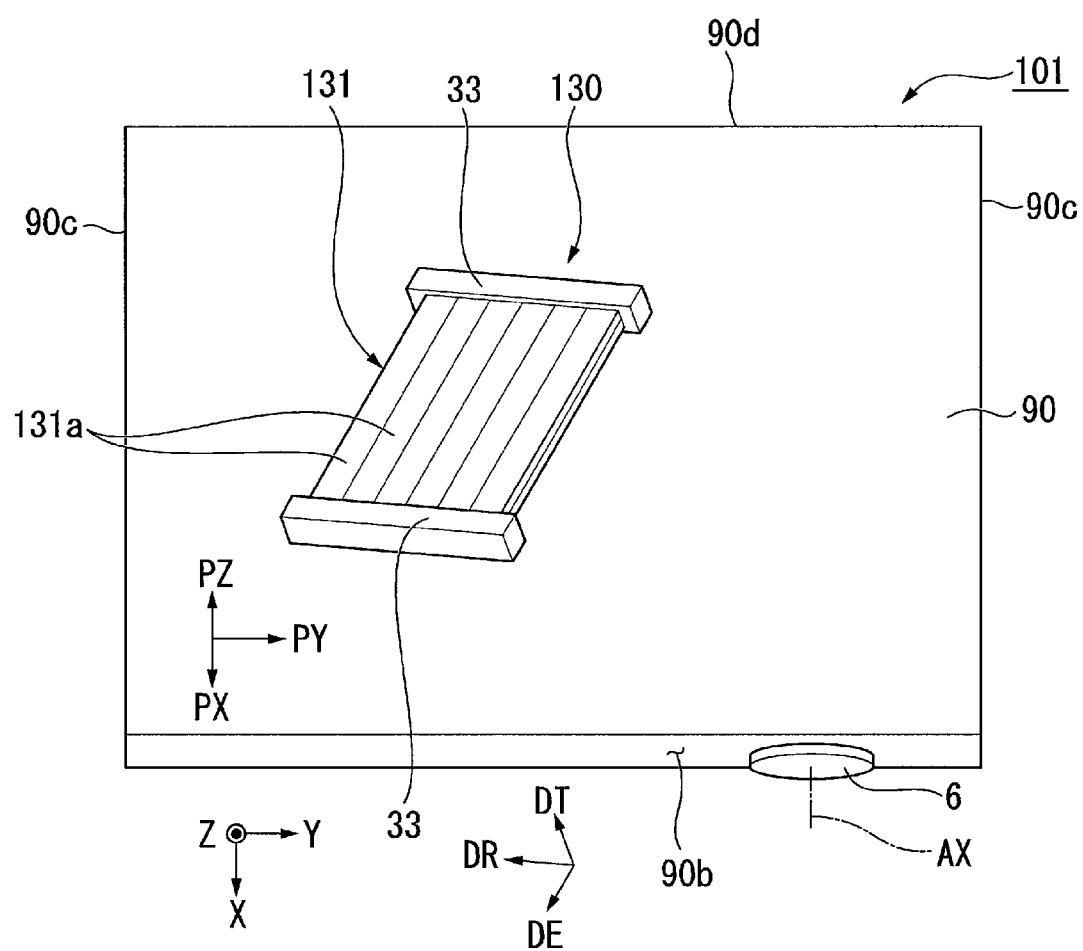
FIG. 19 shows the attitude of the heat exchanger in the second embodiment and is a plane view of the projector in the second embodiment viewed from the upper side in the gravity direction.

FIG. 17 shows the attitude of a heat exchanger 130 according to the present embodiment and is a front view of a projector 101 according to the present embodiment. FIG. 18 shows the attitude of the heat exchanger 130 and is a side view of the projector 101 viewed in the rightward/leftward direction Y. FIG. 19 shows the attitude of the heat exchanger 130 and is a plan view of the projector 101 viewed from the upper side in the gravity direction. In FIGS. 17 to 19, the projector 101 is installed on the floor surface F.

A light-exiting-side (+PX-side) portion of the projector 101 is so lifted by the leg 191, which protrudes from the bottom surface 90a of the enclosure 90, as to separate from the floor surface F, as shown in FIGS. 17 to 19. In FIGS. 17 to 19, the attitude of the projector 101 is so set that the optical axis direction PX inclines with respect to the frontward/rearward direction X, the width direction Y is parallel to the rightward/leftward direction PY, and the height direction PZ inclines with respect to the gravity direction Z.

In the present embodiment, the attitude of the heat exchanger 130 differs from the attitude of the heat exchanger 30 in the first embodiment in that the rotational direction DR inclines with respect to the height direction PZ by a greater amount. The extension direction DE, in which pipes 131a of the flow passage section 131 of the heat exchanger 130 extend, is a direction that inclines with respect to the second surface perpendicular to the optical axis direction PX (front surface 90b and rear surface 90d, for example) and the third surface perpendicular to the bottom surface 90a and the second surface (side surface 90c, for example) out of the bottom surface 90a, the second surface, and the third surface.

The extension direction DE, in which the pipes 131a extend, is parallel to the bottom surface 90a. In the present embodiment, since the light-exiting-side portion of the projector 101 is lifted by the leg 191, the bottom surface 90a inclines with respect to the floor surface F. The extension direction DE, in which the pipes 131a parallel to the bottom surface 90a extend, which is parallel to the bottom surface 90a, therefore inclines with respect to the horizontal plane perpendicular to the gravity direction Z.

Therefore, according to the present embodiment, in the attitude shown in FIGS. 17 to 19, out of the inner surface of the flow passage section 131, the portion facing the lower side in the gravity direction is allowed to incline with respect to the horizontal plane, the accumulation of the refrigerant W in the flow passage section 131 can be avoided.

As described above, in the case where a specific surface of the enclosure 90 is the counter surface that faces the projector installation site, and the projector is partly so lifted as to take an inclining attitude, installing the projector in such a way that the extension direction DE is parallel to the specific surface of the enclosure 90 still allows the extension direction DE to incline with respect to the horizontal plane perpendicular to the gravity direction Z. Therefore, even when the extension direction DE inclines with respect to two of the bottom surface 90a, the second surface, and the third surface, the extension direction DE is allowed to incline with respect to the horizontal plane in any of the six attitudes described above.

The configuration of the flow passage section is not limited to the configuration in the embodiments described above. The flow passage section does not necessarily have a specific configuration as long as the refrigerant W flows through the flow passage section. The flow passage section may, for example, have a box-like shape or a polygonal tubular shape. Still instead, the flow passage section may be formed of one pipe. The attitude of the flow passage section is not limited to the attitude in the embodiments described above. The flow passage section does not necessarily have a specific attitude as long as out of the inner surface of the flow passage section, the portion facing the lower side in the gravity direction inclines with respect to the horizontal plane perpendicular to the gravity direction Z. For example, in the case where the light-exiting-side portion of the projector is lifted by the leg 191, as in the second embodiment, the attitude of the flow passage section may be so set that the extension direction DE is parallel to the optical axis direction PX, the rotational axis direction DR is parallel to the width direction PY, and the thickness direction DT is parallel to the height direction PZ.

The configuration of the enclosure is not limited to the configuration in the embodiments described above. The enclosure does not necessarily have a specific shape. Further, for example, the second and third surfaces may not each be a surface of the enclosure as long as the enclosure has the first surface (counter surface) including the optical axis direction PX and may each instead be an imaginary surface. Specifically, for example, the side surfaces 90*c*, the front surface 90*b*, and the rear surface 90*d* may not be perpendicular to the bottom surface 90*a* described above but may incline with respect thereto.

The configuration of the refrigerant generator is not limited to the configuration in the embodiments described above. The refrigerant generator does not necessarily have a specific configuration and may have any configuration that allows generation of the refrigerant. For example, the refrigerant generator may use a thermoelectric device to condense water vapor in the air in the projector to generate the refrigerant W. Instead, for example, the refrigerant generator may include a fuel cell, such as a hydrogen cell. In this case, for example, water generated by the fuel cell when electric power is supplied to the projector can be used as the refrigerant. The refrigerant is not limited to a specific medium and may be any non-water medium capable of cooling the cooling target. The refrigerant to be generated is not limited to a liquid and may, for example, be a solid. In this case, the solid refrigerant may change to a liquid while the refrigerant is sent to the cooling target or may be sent in the form of the solid to the cooling target. In the case where the refrigerant is sent in the form of the solid to the cooling target, the refrigerant may be sublimated directly into a gas to cool the cooling target or may be melted and changed to a liquid, which then vaporizes to cool the cooling target.

The configuration of the refrigerant sender is not limited to the configuration in the embodiments described above. The refrigerant sender does not necessarily have a specific configuration and may have any configuration that can send the refrigerant to the cooling target. The refrigerant sender may include a pump that sends the refrigerant and a pipe through which the refrigerant sent by the pump passes. The refrigerant sender may still instead send the refrigerant to the cooling target, for example, by using gravity.

The configuration of the cooling facilitators is not limited to the configuration in the embodiments described above. The cooling facilitators do not necessarily have a specific configuration and may have any configuration that can facilitate the cooling of the cooling target performed by the refrigerant sent to the cooling target. For example, the refrigerant holder of each of the cooling facilitators may be minute protruding portions and recessed portions formed in the surface of the cooling target, for example, by processing the surface. In this case, the protruding portions and the recessed portions hold the refrigerant. Still instead, the refrigerant holders may, for example, each be a hydrophilic coating provided on the surface of the cooling target.

The heater in the embodiments described above does not necessarily have the configuration described above. The heater may have a configuration in which the heater comes into contact with the moisture absorbing/discharging member to heat the moisture absorbing/discharging member. In this case, the heater may not heat the air before passing through the moisture absorbing/discharging member.

The cooling target in the embodiments described above is the light modulation units, but not necessarily. The cooling target may include at least one of the light modulators, the light modulation units, the light source device, a wavelength conversion element that converts the wavelength of the light outputted from the light source device, a diffuser element that diffuses the light outputted from the light source device, and a polarization conversion element that converts the polarization direction of the light outputted from the light source device. According to the configuration described above, the portions of the projector can be cooled in the same manner described above.

In the embodiments described above, the description has been made with reference to the case where the invention is applied to a transmission-type projector, and the invention is also applicable to a reflection-type projector. The term "transmission-type" means that the light modulators each including a liquid crystal panel or any other component are of light transmissive type. The term "reflection-type" means that the light modulators are of light reflective type. The light modulators are each not limited, for example, to a liquid crystal panel and may, for example, be a light modulator using a micromirror.

In the embodiments described above, the projector using the three light modulators has been presented by way of example. The invention is also applicable to a projector using only one light modulator and a projector using four or more light modulators.

The configurations described above can be combined with one another to the extent that the combination causes no contradiction.

The entire disclosure of Japanese Patent Application No. 2017-250699, filed Dec. 27, 2017 is expressly incorporated by reference herein.

What is claimed is:

1. A projector comprising:
   a light source device configured to emit light;
   a light modulator configured to modulate the light emitted from the light source device in accordance with an image signal;
   a projection optical device configured to project the light modulated by the light modulator; and
   a cooler configured to cool a cooling target based on transformation of a refrigerant into a gas,
   wherein the cooler includes
      a refrigerant generator configured to generate the refrigerant, and
      a refrigerant sender configured to send the generated refrigerant toward the cooling target,
   wherein the refrigerant generator includes a flow passage section through which the refrigerant flows, and
   wherein a portion of an inner surface of the flow passage section that is a portion facing a lower side in a gravity direction inclines with respect to a horizontal plane perpendicular to the gravity direction.

2. The projector according to claim 1,
   wherein the flow passage section includes a pipe extending in a predetermined direction, and wherein the predetermined direction is a direction that inclines with respect to the horizontal plane perpendicular to the gravity direction.

3. The projector according to claim 1,
wherein the flow passage section includes a pipe extending in a predetermined direction, and
wherein the predetermined direction is a direction that inclines with respect to a first direction parallel to an optical axis of the projection optical device and further inclines with respect to a plane perpendicular to the first direction.

4. The projector according to claim 1,
further comprising an enclosure accommodating the light source device, the light modulator, the projection optical device and the cooler,
wherein the flow passage section includes a pipe extending in a predetermined direction,
wherein the enclosure has a first surface extending in a first direction parallel to an optical axis of the projection optical device, and
wherein the predetermined direction is a direction that inclines with respect to at least two of the first surface, a second surface perpendicular to the first direction, and a third surface perpendicular to the first surface and the second surface.

5. The projector according to claim 4,
wherein the predetermined direction is a direction that inclines with respect to all the first surface, the second surface, and the third surface.

6. The projector according to claim 1,
further comprising an enclosure accommodating the light source device, the light modulator, the projection optical device and the cooler,
wherein the flow passage section includes a pipe extending in a predetermined direction,
wherein the enclosure has a surface extending in a first direction parallel to an optical axis of the projection optical device, the surface being a counter surface that faces an installation site where the projector is installed, and
wherein the predetermined direction is a direction that inclines with respect to the first direction in such a way that the predetermined direction separates away from the counter surface as the predetermined direction extends toward a light exiting side of the projection optical device.

7. The projector according to claim 1,
wherein the refrigerant generator includes
a moisture absorbing/discharging member rotating,
a first air blower configured to deliver air to a portion of the moisture absorbing/discharging member that is a portion located in a first region,
a heat exchanger connected to the refrigerant sender,
a heater configured to heat a portion of the moisture absorbing/discharging member that is a portion located in a second region different from the first region, and
a second air blower configured to deliver, to the heat exchanger, air around the portion of the moisture absorbing/discharging member that is the portion heated by the heater,
wherein the heat exchanger includes the flow passage section into which the air delivered from the second air blower flows, and
wherein the flow passage section, by cooling the air having flowed into the passage section, generates the refrigerant from the air having flowed into the flow passage section.

* * * * *